(12) United States Patent
Ohshima

(10) Patent No.: US 11,112,603 B2
(45) Date of Patent: Sep. 7, 2021

(54) OPTICAL SCANNER, DISPLAY SYSTEM, AND MOBILE OBJECT

(71) Applicant: Katsuya Ohshima, Kanagawa (JP)

(72) Inventor: Katsuya Ohshima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/747,615

(22) Filed: Jan. 21, 2020

(65) Prior Publication Data
US 2020/0296248 A1 Sep. 17, 2020

(30) Foreign Application Priority Data
Mar. 15, 2019 (JP) .............................. JP2019-047934

(51) Int. Cl.
*G02B 27/01* (2006.01)
*H04N 1/053* (2006.01)
*H04N 3/08* (2006.01)
*H04N 9/31* (2006.01)

(52) U.S. Cl.
CPC ..... *G02B 27/0101* (2013.01); *G02B 27/0149* (2013.01); *H04N 1/053* (2013.01); *H04N 3/08* (2013.01); *H04N 9/3135* (2013.01); *H04N 9/3161* (2013.01); *G02B 2027/0161* (2013.01)

(58) Field of Classification Search
CPC ............ G02B 27/0101; G02B 27/0149; G02B 27/01; G02B 26/0833; G02B 26/127; G02B 26/101; G02B 2027/0161; G02B 2027/0145; H04N 1/053; H04N 3/08; H04N 9/3135; H04N 9/3161
See application file for complete search history.

(56) References Cited

U.S. PATENT DOCUMENTS

| 2017/0154558 A1 | 6/2017 | Atsuumi et al. |
| 2018/0013992 A1 | 1/2018 | Hayashi |
| 2018/0020198 A1* | 1/2018 | Ogi ...................... H04N 9/3111 |
| 2018/0184059 A1* | 6/2018 | Arakawa .............. G02B 26/101 |
| 2018/0240387 A1 | 8/2018 | Atsuumi et al. |
| 2019/0285886 A1 | 9/2019 | Yamashiro et al. |

FOREIGN PATENT DOCUMENTS

| EP | 3267236 A1 * | 1/2018 | |
| EP | 3267236 A1 * | 1/2018 | .......... G02B 26/101 |
| JP | 2011-013277 | 1/2011 | |

OTHER PUBLICATIONS

Extended European Search Report dated Jul. 27, 2020.

* cited by examiner

*Primary Examiner* — Brent D Castiaux
(74) *Attorney, Agent, or Firm* — Harness, Dickey & Pierce, P.L.C.

(57) ABSTRACT

An optical scanner includes a light source to emit irradiation light, a light deflector to scan the irradiation light emitted from the light source in a first scanning direction and in a second scanning direction intersecting with the first scanning direction, a photodetector to detect the irradiation light when the light deflector scans a detection field, and circuitry to turn on the light source in a first irradiation field scanned by the light deflector from the detection field to an end in the first scanning direction and turn on the light source in a second irradiation field scanned by the light deflector from the end in the first scanning direction towards the detection field, and cause an edge of the first irradiation field on the detection field side to move to get close to the detection field from a position away from the detection field.

20 Claims, 22 Drawing Sheets

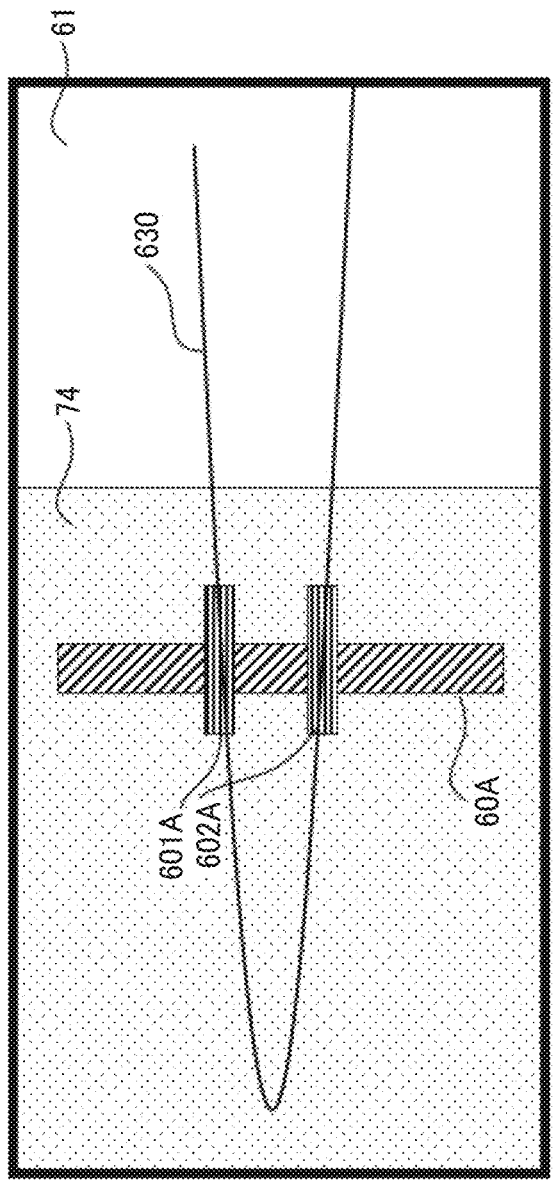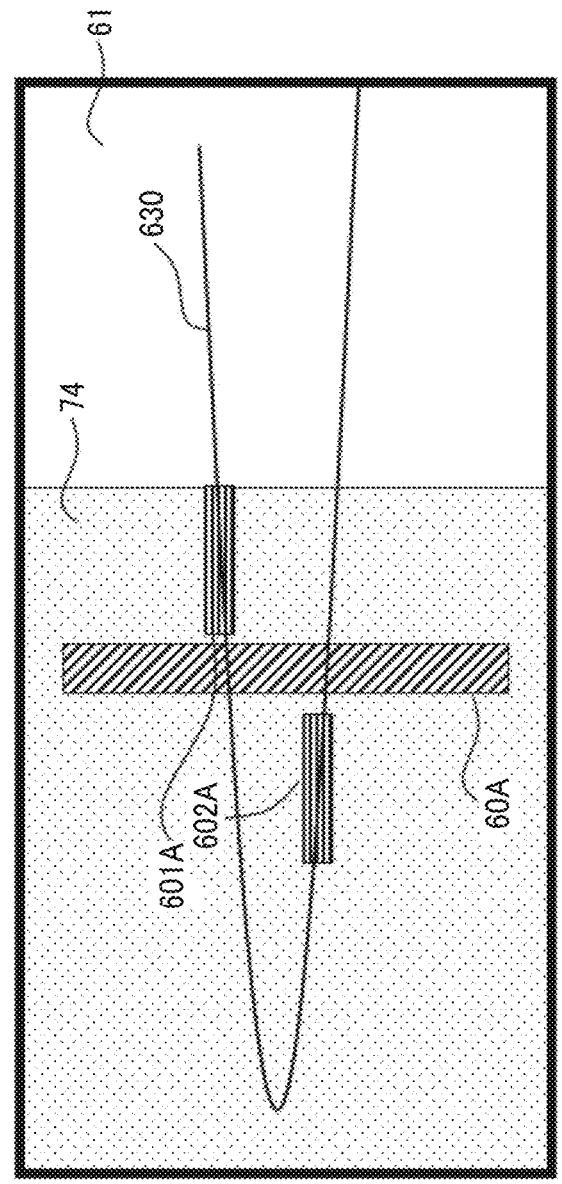
FIG. 19A
FIG. 19B

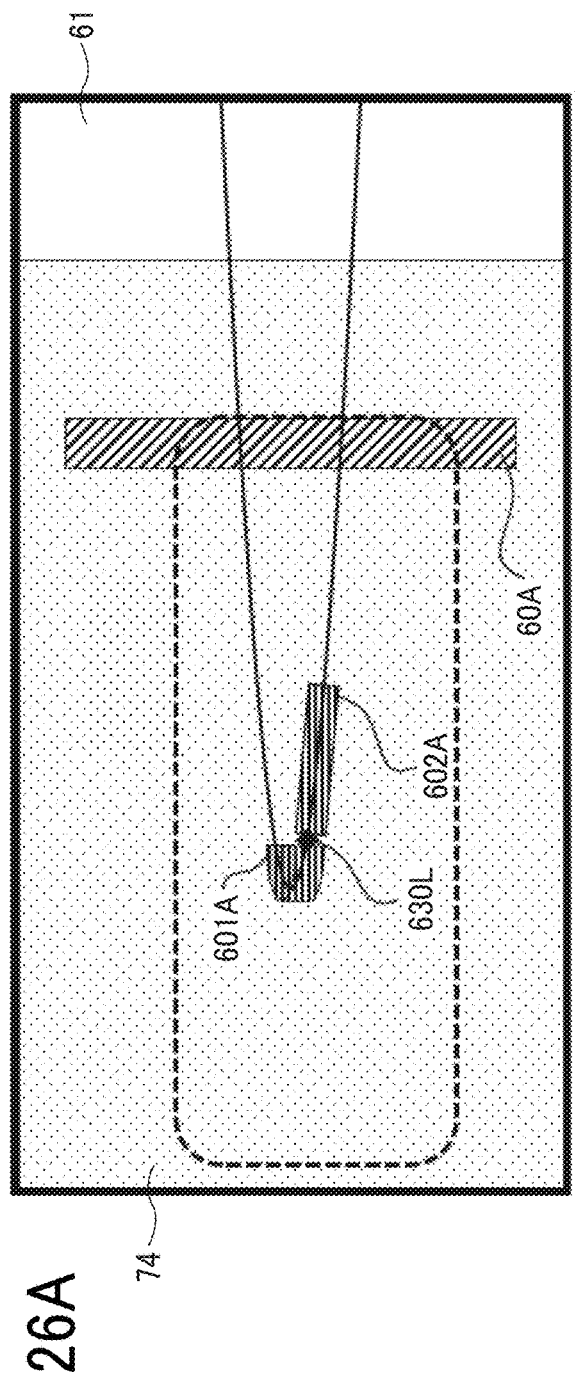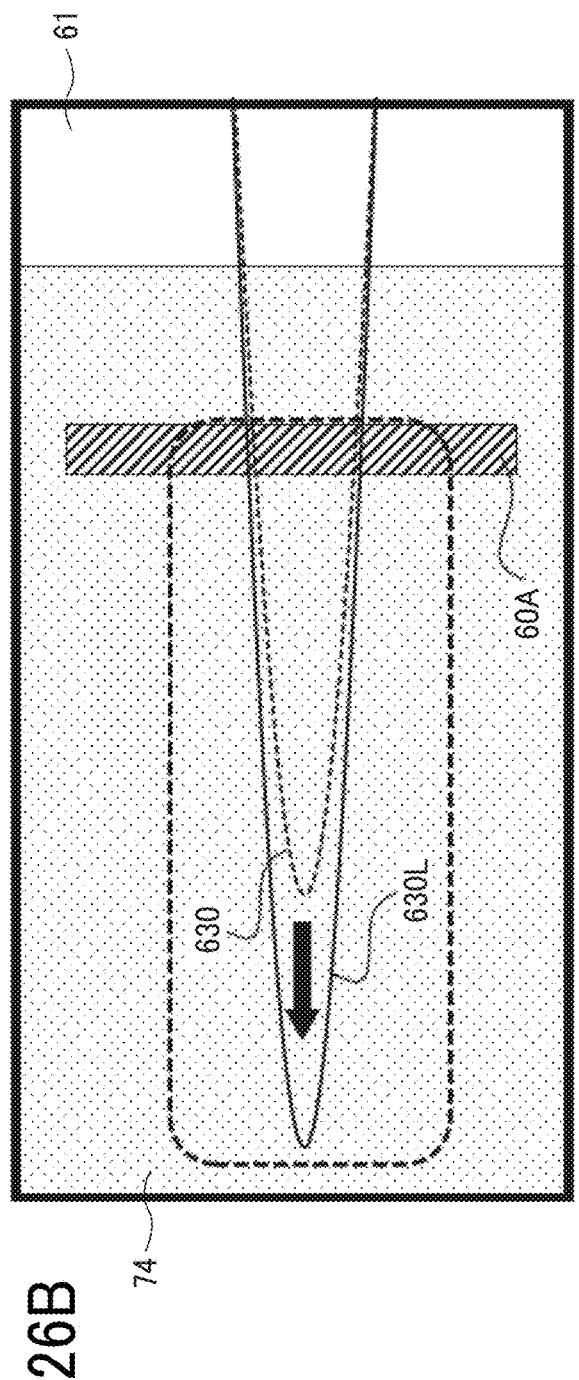
FIG. 26A
FIG. 26B

OPTICAL SCANNER, DISPLAY SYSTEM, AND MOBILE OBJECT

CROSS-REFERENCE TO RELATED APPLICATION

This patent application is based on and claims priority pursuant to 35 U.S.C. § 119(a) to Japanese Patent Application No. 2019-047934, filed on Mar. 15, 2019, the Japan Patent Office, the entire disclosure of which is hereby incorporated by reference herein.

BACKGROUND

Technical Field

Embodiments of the present disclosure relate to an optical scanner, a display system, and a mobile object.

Background Art

A steadily-operable optical scanner is known in the art in which both a wide deflection angle and stable operation are achieved in spite of changes in the resonance frequency of an optical scanner due to extraneous disturbance such as changes in temperature and deterioration over time.

SUMMARY

Embodiments of the present disclosure described herein provide an optical scanner including a light source to emit irradiation light, a light deflector to scan the irradiation light emitted from the light source in a first scanning direction and in a second scanning direction intersecting with the first scanning direction, a photodetector to detect the irradiation light when the light deflector scans a detection field, and circuitry to turn on the light source in a first irradiation field scanned by the light deflector from the detection field to an end in the first scanning direction and turn on the light source in a second irradiation field scanned by the light deflector from the end in the first scanning direction towards the detection field, and cause an edge of the first irradiation field on the detection field side to move to get close to the detection field from a position away from the detection field and cause an edge of the second irradiation field on the detection field side to move to get close to the detection field from a position away from the detection field.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 19A and FIG. 19B are diagrams illustrating the effect produced by the difference in drive frequency on a mirror, according to an embodiment of the present disclosure.

FIG. 26A and FIG. 26B are diagram each illustrating a method of adjusting a irradiation field, according to an embodiment of the present disclosure.

Figure 1:
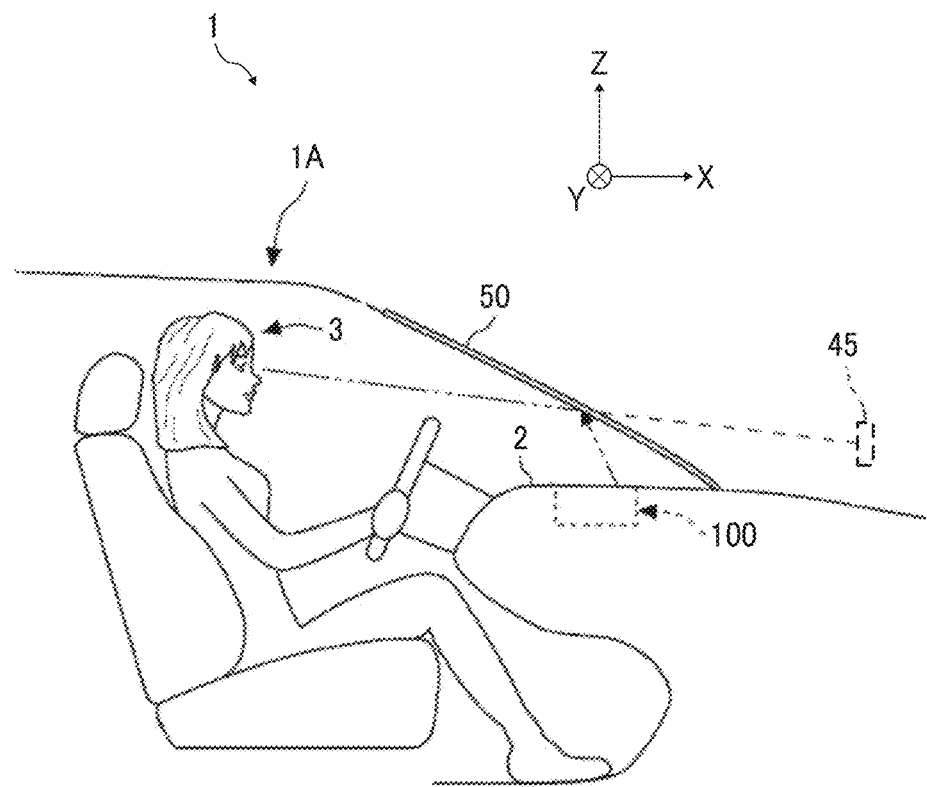
FIG. 1 is a diagram illustrating a system configuration of a display system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the accompanying drawings. In the description of the drawings, like reference signs denote like elements, and overlapping descriptions are omitted.

FIG. 1 is a diagram illustrating a system configuration of a display system 1 according to an embodiment of the present disclosure.

In the display system 1, the viewer 3 can visually identify a display image as projection light is projected from a mounted device 100 onto a transmissive reflector. The mounted device 100 is an example of a projector, and the display image is an image superimposed on the viewing field of the viewer 3 as a virtual image 45. For example, the display system 1 is provided for a mobile object such as a vehicle, an aircraft, and a ship, or an immobile object such as a maneuvering simulation system, and a home-theater system. In the present embodiment, cases are described in which the display system 1 is provided for a car that is an example of a mobile object 1A. However, no limitation is intended thereby, and the type of usage of the display system 1 is not limited to the present embodiment. The coordinate axes are defined as follows assuming that the directions of travel of the mobile object 1A is the X-axis direction, the right and left directions of the mobile object 1A is the Y-axis direction, and the up-and-down directions of the mobile object 1A is the Z-axis direction.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the front windshield 50 serves as a transmissive reflector that transmits a portion of the incident light and reflects at least some of the remaining incident light. The distance between the location of the eyepoint of the viewer 3 and the front windshield 50 is about several tens of centimeters (cm) to one meter (m). In some embodiments, a combiner that is made of a small transparent plastic disk or the like may be used as a transmissive reflector in place of the front windshield 50.

For example, the mounted device 100 is a heads-up display (HUD). The mounted device 100 may be disposed at any desired position in conformity with the interior design of the car. For example, the mounted device 100 may be disposed under a dashboard 2 of the car or may be embedded in the dashboard 2. In the present embodiment, cases in which the mounted device 100 is mounted in the dashboard 2 are described.

Figure 2:
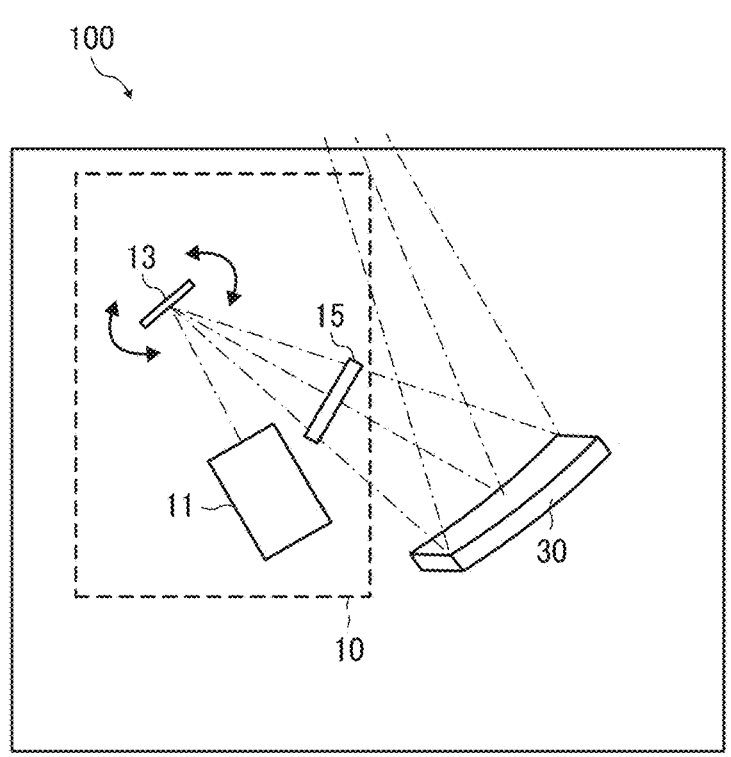
FIG. 2 is a diagram illustrating a configuration of a mounted device according to an embodiment of the present disclosure.

FIG. 2 is a diagram illustrating a configuration of the mounted device 100 according to the present embodiment.

The mounted device 100 includes a display device 10, a free-form surface mirror 30, and a front windshield 50.

The display device 10 includes a light-source device 11, a light deflector 13, and a screen 15. The light-source device 11 is a device that emits the laser beams emitted from a light source outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 is an example of an image forming unit that receives the irradiation light emitted from the light-source device 11 and emits image light for forming an image. The light deflector 13 uses, for example, a microelectromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams emitted from the light deflector 13 scans the screen 15. The light deflector 13 is not limited to a MEMS mirror, but may be configured by a polygon mirror or the like.

The screen 15 is an example of a screen on which the image light emitted from the light deflector 13 forms an image. The screen 15 serves as a divergent part that diverges the laser beams at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light. The screen 15 forms a two-dimensional intermediate image 40 on the screen 15 as the laser beams emitted from the light deflector 13 scan the surface of the screen 15.

A method of projecting an image using the display device 10 may be implemented by a panel system or a laser scanning system. In the panel system, the intermediate image 40 is formed by an imaging device such as a liquid crystal panel, a digital micromirror device (DMD) panel (digital mirror device panel), or a vacuum fluorescent display (VFD). In the laser scanning system, the intermediate image 40 is formed by scanning the laser beams emitted from the light-source device 11, using an optical scanner.

The display device 10 according to the present embodiment adopts the laser scanning system. In particular, in the laser scanning system, since emitting/non-emitting can be assigned to each pixel, in general, a high-contrast image can be formed. In some alternative embodiments, the panel system may be adopted as the projection system in the display device 10.

The virtual image 45 is projected onto the free-form surface mirror 30 and the front windshield 50 as the intermediate image 40 that is formed by the laser beams (bundle of laser beams) emitted from the screen 15 is magnified for view. The free-form surface mirror 30 is designed and arranged so as to cancel, for example, the inclination of the image, the distortion of the image, and the displacements of the image, which are caused by the bent shape of the front windshield 50. The free-form surface mirror 30 may be arranged in a pivotable manner around the rotation axis. Due to such a configuration, the free-form surface mirror 30 can adjust the reflection direction of the laser beams (bundle of laser beams) emitted from the screen 15 to change the position at which the virtual image 45 is displayed.

In the present embodiment, the free-form surface mirror 30 is designed using a commercially available optical design simulation software such that the free-form surface mirror 30 has a certain level of light-gathering power to achieve a desired image-forming position of the virtual image 45. In the display device 10, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m). The free-form surface mirror 30 may be a concave mirror or an element with a light-gathering power. The free-form surface mirror 30 is an example of an image forming optical system.

The front windshield 50 serves as a transmissive reflector that transmits some of the laser beams (bundle of laser beams) and reflects at least some of the remaining laser beams (partial reflection). The front windshield 50 may serve as a semitransparent mirror through which the viewer 3 visually recognizes the virtual image 45 and the scenery ahead of the mobile object (vehicle). The virtual image 45 is an image that is visually recognized by the viewer 3, including vehicle-related information (e.g., speed and travel distance), navigation information (e.g., route guidance and traffic information), and warning information (e.g., collision warning). For example, the transmissive reflector may be another front windshield arranged in addition to the front windshield 50. The front windshield 50 is an example of a reflector.

The virtual image 45 may be displayed so as to be superimposed on the scenery ahead of the front windshield 50. The front windshield 50 is not flat but is curved. For this reason, the position at which the virtual image 45 is formed is determined by the curved surface of the free-form surface mirror 30 and the front windshield 50. In some embodiments, the front windshield 50 may be a semitransparent mirror (combiner) that serves as a separate transmissive having a reflector partial reflection function.

Due to such a configuration as above, the laser beams (bundle of laser beams) emitted from the screen 15 are projected towards the free-form surface mirror 30, and are reflected by the front windshield 50. Accordingly, the viewer 3 can visually recognize the virtual image 45, i.e., the magnified image of the intermediate image 40 formed on the screen 15, due to the light reflected by the front windshield 50.

Figure 3:
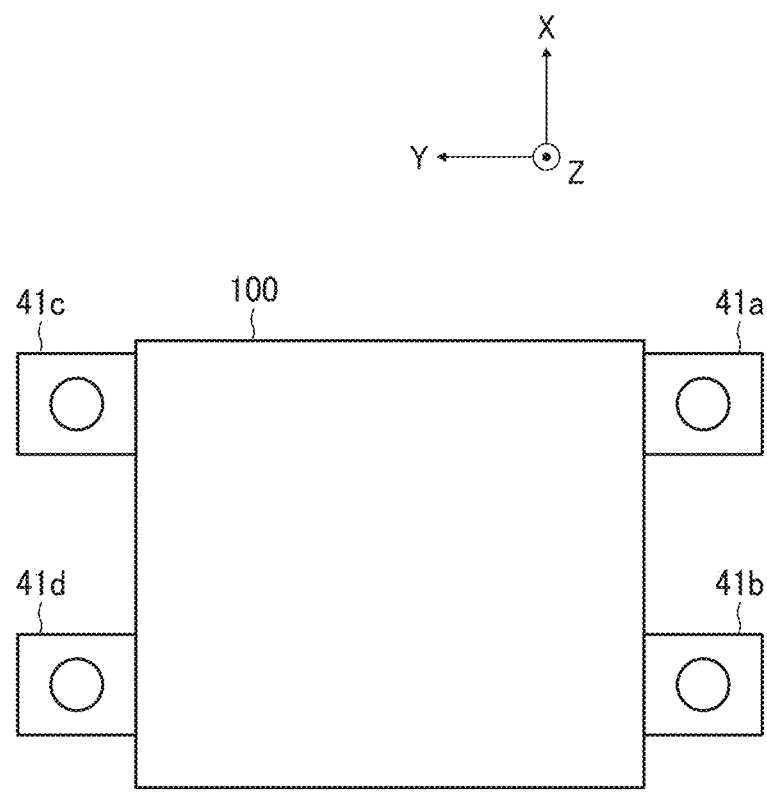
FIG. 3 is a top view of a mounted device according to an embodiment of the present disclosure.

FIG. 3 is a diagram illustrating a top view of the mounted device 100 according to the present embodiment.

As illustrated in FIG. 3, the mounted device 100 includes two attaching parts 41a and 41b on the right side, and includes two attaching parts 41c and 41d on the left side. These attaching parts 41a, 41b, 41c, and 41d are used to attach the mounted device 100 to the mobile object 1A. Each of the attaching parts 41a to 41d has a screw hole, and the mounted device 100 is attached to the mobile object 1A through these screw holes.

Figure 4:
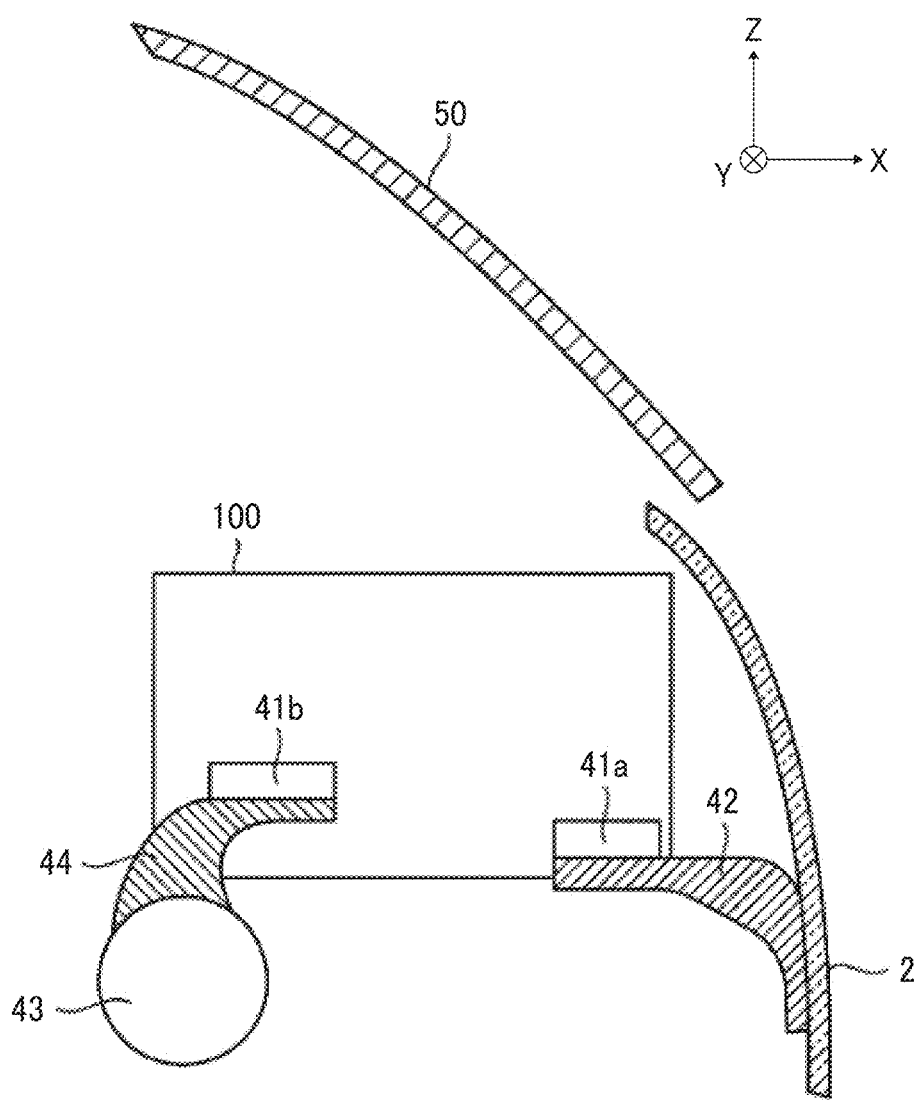
FIG. 4 is a side view of a mounted device according to an embodiment of the present disclosure.

FIG. 4 is a right side view of the mounted device 100 attached to the mobile object 1A, according to the present embodiment.

The mobile object 1A includes an attaching bracket 42, which is welded or fastened to the dashboard 2, and an attaching bracket 44, which is welded or fastened to a cross car beam 43. The attaching bracket 42 and the attaching bracket 44 are an example of an installation part. The mounted device 100 is attached to the mobile object 1A by fastening the attaching parts 41a and 41c to the attaching bracket 42 using screws or the like and by fastening the attaching parts 41b and 41d to the attaching bracket 44 using screws or the like.

Figure 5:
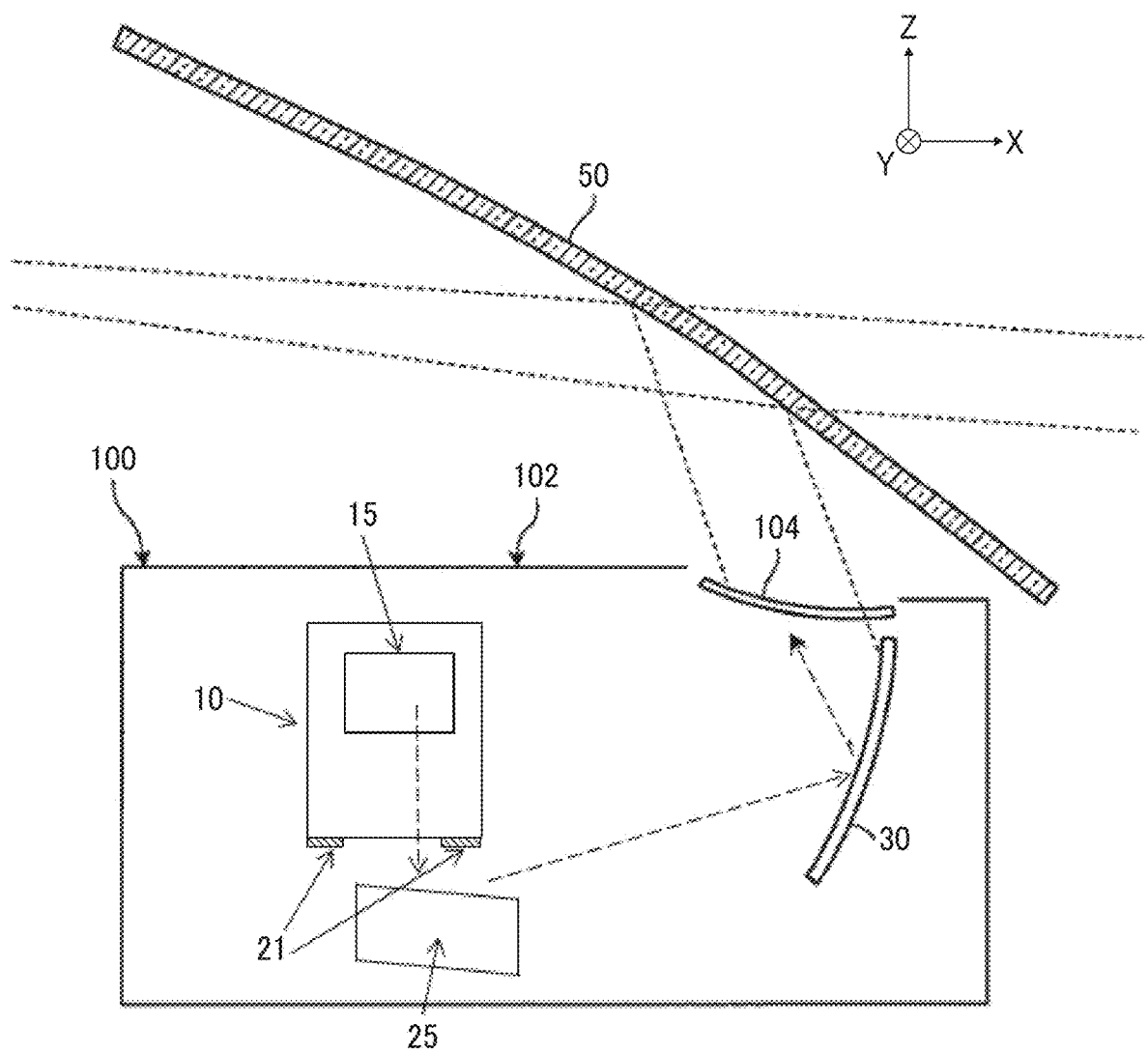
FIG. 5 is a cross-sectional side view of a mounted device according to an embodiment of the present disclosure.

FIG. 5 is a cross-sectional side view of the mounted device 100 as viewed from the right direction (the right side in the Y-direction), according to the present embodiment.

Figure 6:
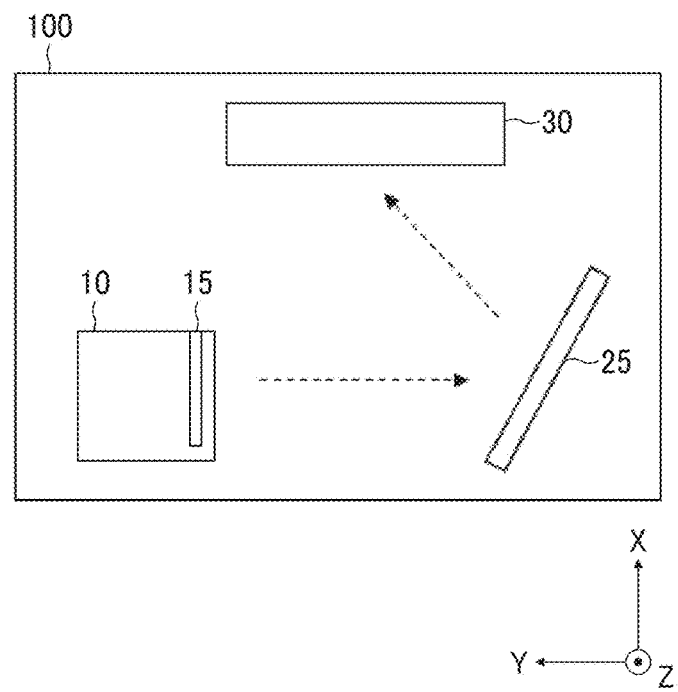
FIG. 6 is a cross-sectional top view of a mounted device according to an embodiment of the present disclosure.

FIG. 6 is a cross-sectional top view of the mounted device 100 as viewed from the upward direction (the Z-direction), according to the present embodiment.

FIG. 5 and FIG. 6 illustrate a concrete arrangement inside the mounted device 100 according to the present embodiment.

In addition to the display device 10 and the free-form surface mirror 30 as described above with reference to FIG. 2, the mounted device 100 includes a mirror 25 that is arranged inside a housing 102 to reflect the laser beams projected from the display device 10 towards the free-form surface mirror 30. The housing 102 has an exit window 104 that transmits the light reflected by the free-form surface mirror 30 and projects the reflected light onto the front windshield 50. The exit window is an example of a light transmission member. The display device 10 and the screen 15 are arranged so that the laser beams are projected in the right direction (the right side in the Y-direction).

Figure 7:
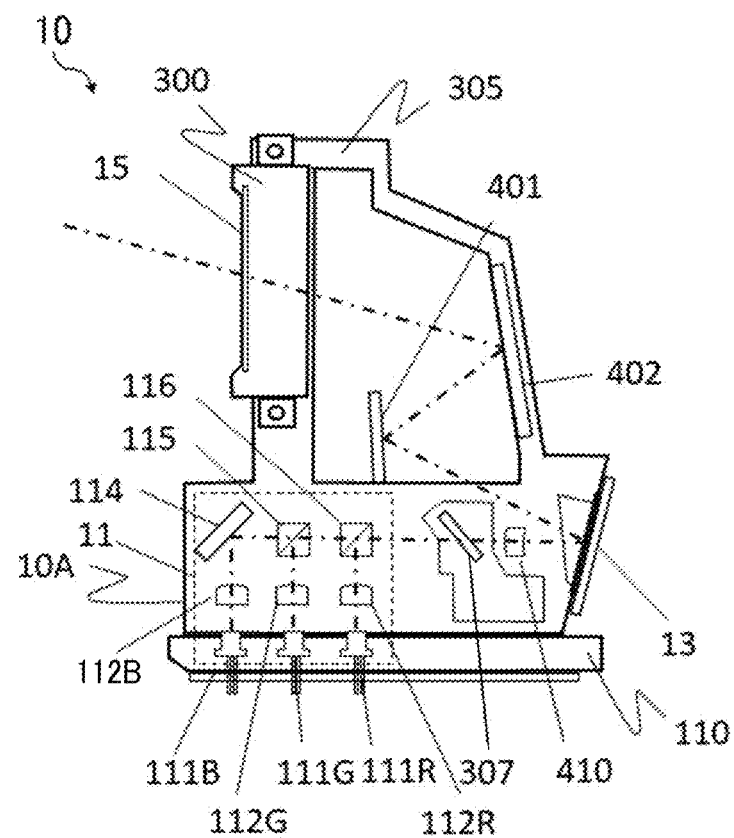
FIG. 7 is a diagram illustrating a configuration of a display device according to an embodiment of the present disclosure.

FIG. 7 is a diagram illustrating a configuration of the display device 10 according to the present embodiment.

In addition to the light-source device 11, the light deflector 13, and the screen 15 as described above with reference to FIG. 2, the display device 10 further includes a filter 307 that modulates the laser beams emitted from the light-source device 11, a condenser lens 410 that condenses the laser beams modulated by the filter 307 towards the light deflector 13, a first mirror 401 that reflects the laser beams deflected by the light deflector 13, and a second mirror 402 that reflects the laser beams reflected by the first mirror 401 towards the screen 15.

The light-source device 11 includes light-source elements 111R, 111G, and 111B (that may collectively be referred to as the light-source element 111 in the following description when it is not necessary to distinguish each of the light-source elements), coupling (collimate) lenses 112R, 112G, and 112B, and combiners 114, 115, and 116.

For example, each of the light-source elements 111R, 111G, and 111B of three colors (red, green, and blue (RGB))

is a laser diode (LD) having a single or a plurality of light-emitting points. The light-source elements 111R, 111G, and 111B emit laser beams (light flux) having different wavelengths λR, λG, and λB, respectively. For example, λR=640 nanometers (nm), λ6=530 nm, and λB=445 nm.

The emitted laser beams (light flux) are coupled by the coupling lenses 112R, 112G, and 112B, respectively, and become approximately collimated light flux. The coupled laser beams (light flux) are combined by the three combiners 114, 115, and 116. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. The combined laser beams (light flux) pass through the filter 307 and the condenser lens 410 and are guided to the light deflector 13.

The display device 10 is formed by assembling a housing 10A, a mirror unit (mirror holding member) 305, and a screen unit 300. The housing 10A holds and stores the light-source elements 111R, 111G, and 111B, the coupling lenses 112R, 112G, and 112B, the combiners 114, 115, and 116, the filter 307, the condenser lens 410, and the light deflector 13. The mirror unit 305 holds the first mirror 401 and the second mirror 402. The screen unit 300 is an example of a holding member that holds the screen 15.

A light source unit 110 is removable from the housing 10A and holds the light-source elements 111R, 111G, and 111B.

Figure 8:
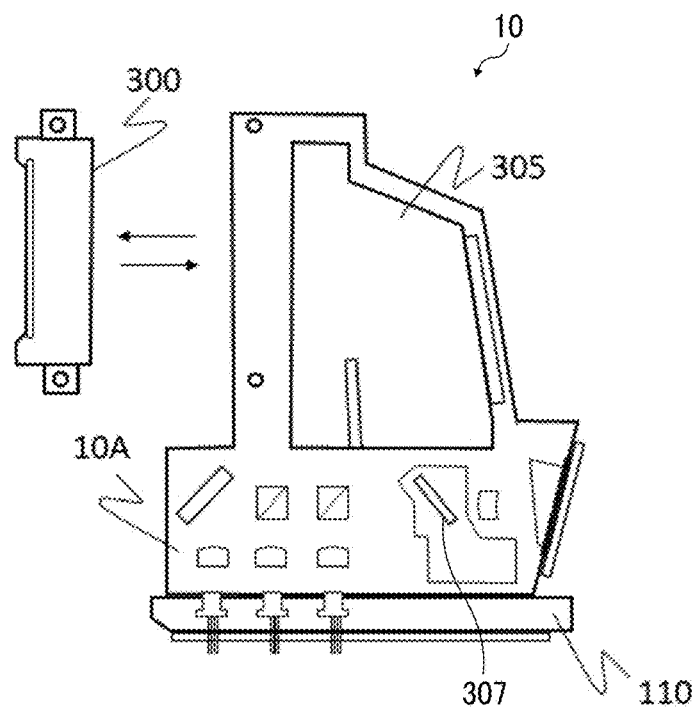
FIG. 8 is a diagram illustrating how a screen unit is attached to and removed from a display device, according to an embodiment of the present disclosure.

FIG. 8 illustrates how the screen unit 300 is attached to and removed from the display device 10, according to the present embodiment.

The screen unit 300 is attachable to and removable from the housing 10A without removing the light source unit 110 and the mirror unit 305 from the housing 10A. Moreover, the screen unit 300 is attachable to and removable from the housing 10A without removing the light-source device 11, the filter 307, the condenser lens 410, and the light deflector 13

The housing 10A is made of die-casting aluminum, and the mirror unit 305 is made of resin. The housing 10A has a higher thermal conductivity than the mirror unit 305.

The image light that diverges through the screen 15 reaches the front windshield 50 along the light path as illustrated in FIG. 1 and FIG. 2. However, in actual use, the sunlight that irradiates the front windshield 50 may travel reversely along the light path and may reach the screen 15 or the screen unit 300. In such cases, the shape or color of the screen 15 may change due to the heat of the sunlight, and the image quality may deteriorate.

In order to handle such a situation, in the present embodiment, the screen unit 300 is attached to the housing 10A. By so doing, compared with a case in which the screen unit 300 is attached to the mirror unit 305 that is positioned on the upstream side on the optical path, the heat of the screen 15 and the screen unit 300 can be easily dissipated, and the reduction in image quality can be prevented.

Moreover, the screen unit 300 is attachable to and removable from the housing 10A without removing, for example, the first mirror 401 and the second mirror 402 held by the mirror unit 305, the light deflector 13 from the housing 10A. Due to this configuration, the replacement or maintenance of the screen unit 300 can easily be performed in an independent manner. Accordingly, even when the shape or color of the screen 15 changes, the reduction in image quality can be prevented by performing replacement or maintenance of the screen 15.

As the curvature of the front windshield 50 differs depending on its type (vehicle type) of the mobile object 1A, the size, the position, and the angle of the screen 15 need to be adjusted in a delicate manner in accordance with the imaging optical system (i.e., the free-form surface mirror 30). However, by making the screen unit 300 detachable from the housing 10A or the like, the housing 10A or the like can be shared, and the productivity can be improved.

Figure 9:
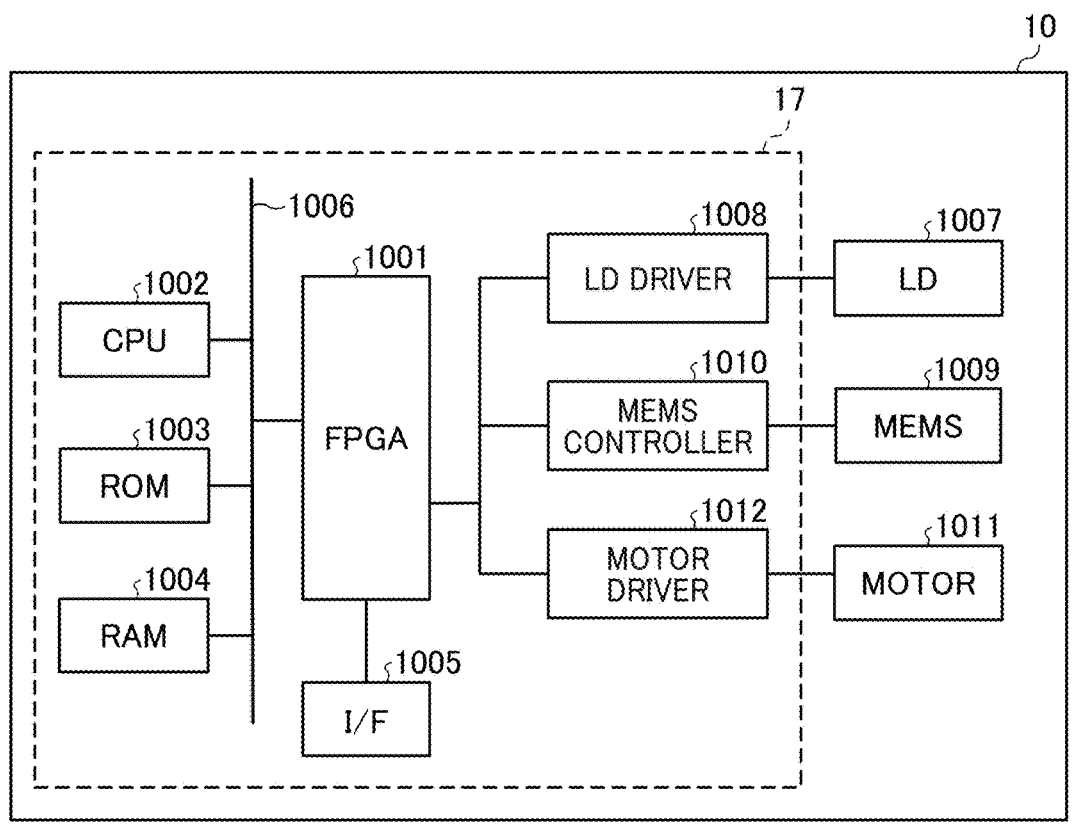
FIG. 9 is a diagram illustrating a hardware configuration of a display device according to an embodiment of the present disclosure.

FIG. 9 is a diagram illustrating a hardware configuration of the display device 10 according to the present embodiment.

When necessary, some components or elements may be added to or deleted from the hardware configuration illustrated in FIG. 2.

The display device 10 includes a controller 17 that controls the operation of the display device 10. For example, the controller 17 is a circuit board or integrated circuit (IC) chip mounted inside the display device 10. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012.

The FPGA 1001 is an integrated circuit that is configurable by the designer of the display device 10. The LD driver 1008, the MEMS controller 1010, and the motor driver 1012 generate a driving signal according to the control signal output from the FPGA 1001. The CPU 1002 is an integrated circuit that controls the entirety of the display device 10. The ROM 1003 is a storage device that stores a program for controlling the CPU 1002. The RAM 1004 is a storage device that serves as a work area of the CPU 1002. The interface 1005 communicates with an external device. For example, the interface 1005 is coupled to the controller area network (CAN) of a vehicle.

For example, the LD 1007 is a semiconductor light-emitting element that configures a part of the light-source device 11. The LD driver 1008 is a circuit that generates a driving signal for driving the LD 1007. The MEMS 1009 configures a part of the light deflector 13 and moves the scanning mirror. The MEMS controller 1010 is a circuit that generates a driving signal for driving the MEMS 1009. The motor 1011 is an electric motor that rotates the rotation axis of the free-form surface mirror 30. The motor driver 1012 is a circuit that generates a driving signal for driving the motor 1011.

Figure 10:
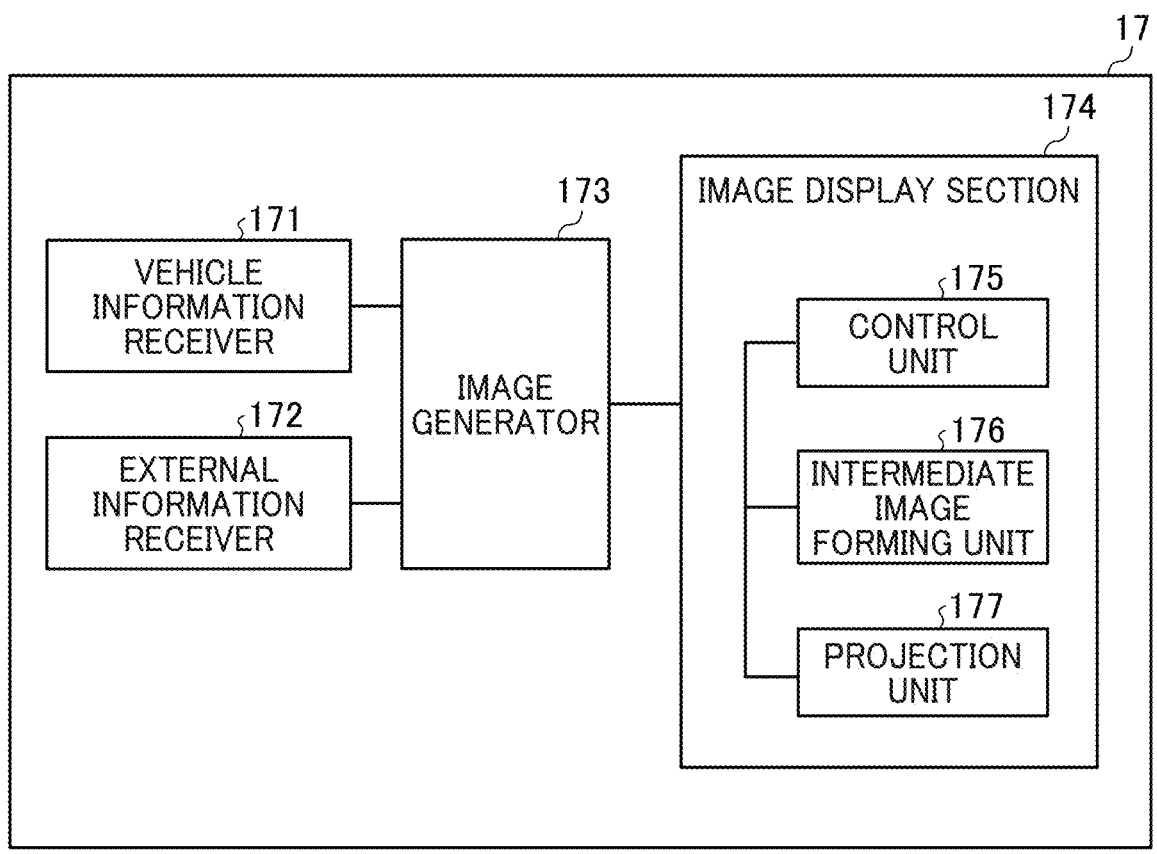
FIG. 10 is a diagram illustrating a functional configuration of a display device according to an embodiment of the present disclosure.

FIG. 10 is a diagram illustrating a functional configuration of a display device according to an embodiment of the present disclosure.

The functions that are implemented by the display device 10 include a vehicle-related information receiver 171, an external information receiver 172, an image generator 173, and an image display unit 174.

The vehicle-related information receiver 171 is a function to receive vehicle-related information (e.g., speed and travel distance) from a controller area network (CAN) or the like. For example, the vehicle-related information receiver 171 is implemented by some of the elements illustrated in FIG. 2. In particular, the vehicle-related information receiver 171 may be implemented by the interface 1005, the processing performed by the CPU 1002, and a program stored in the ROM 1003.

The external information receiver 172 receives external information (for example, position information from the global positioning system (GPS), routing information from a navigation system, and traffic information) of the vehicle from an external network. For example, the external information receiver 172 is implemented by some of the elements illustrated in FIG. 2. In particular, the external information receiver 172 may be implemented by the interface 1005, the processing performed by the CPU 1002, and a program stored in the ROM 1003.

The image generator 173 is a function to generate image data, which is used to display the intermediate image 40 and the virtual image 45, based on the data input from the vehicle-related information receiver 171 and the external information receiver 172. For example, the image generator 173 is implemented by some of the elements illustrated in FIG. 2. In particular, the image generator 173 may be implemented by the processing performed by the CPU 1002, and a program stored in the ROM 1003.

The image display unit 174 is a function to form the intermediate image 40 on the screen 15 based on the image data generated by the image generator 173, and to project the laser beams (bundle of laser beams) that form the intermediate image 40 towards the front windshield 50 to display the virtual image 45. For example, the image display unit 174 is implemented by some of the elements illustrated in FIG. 2. In particular, the image display unit 174 may be implemented by the processing performed by the CPU 1002, the FPGA 1001, the LD driver 1008, the MEMS controller 1010, and the motor driver 1012, as well as a program stored in the ROM 1003.

The image display unit 174 includes a control unit 175, an intermediate image forming unit 176, and a projection unit 177. In order to form the intermediate image 40, the control unit 175 generates a control signal used to control the operation of the light-source device 11 and the light deflector 13. Moreover, the control unit 175 generates a control signal that controls the operation of the free-form surface mirror 30 to display the virtual image 45 at a desired position.

The intermediate image forming unit 176 forms an intermediate image 40 on the screen 15 based on the control signal generated by the control unit 175. The projection unit 177 projects the laser beams that form the intermediate image 40 towards the transmissive reflector (e.g., the front windshield 50) in order to form the virtual image 45 to be visually recognized by the viewer 3.

Figure 11:
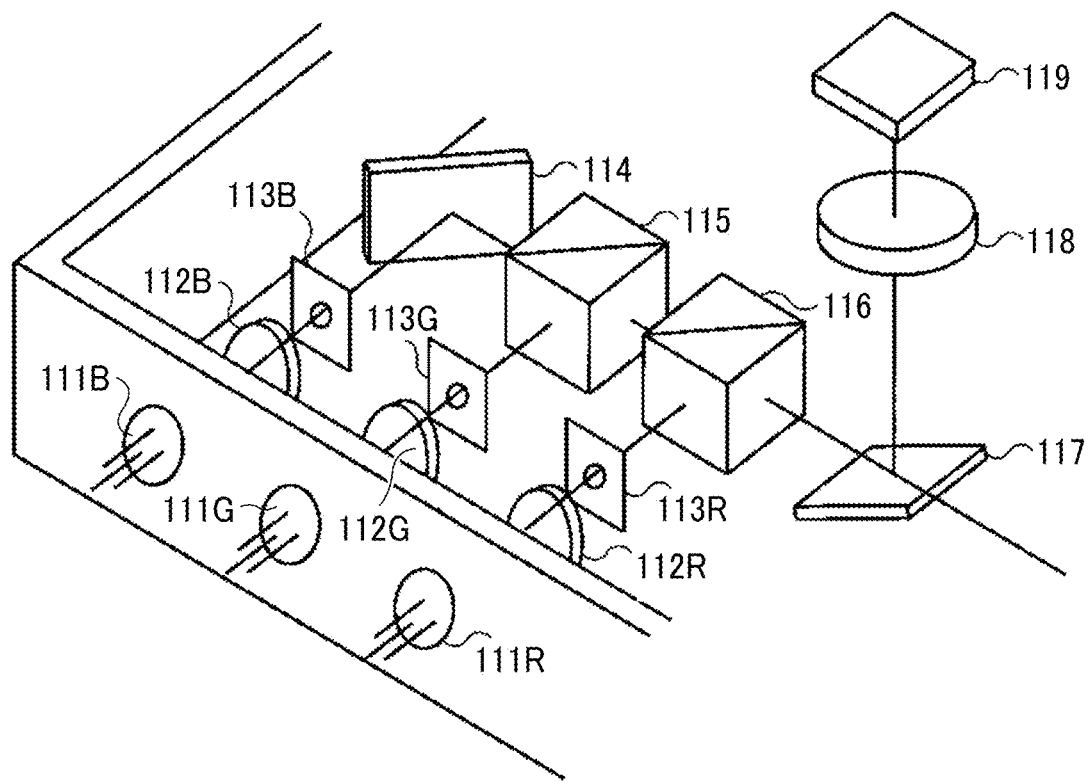
FIG. 11 is a diagram illustrating a specific configuration of a light-source device according to an embodiment of the present disclosure.

FIG. 11 is a diagram illustrating a specific configuration of the light-source device 11 according to the present embodiment.

In addition to the elements as described above with reference to FIG. 7, the light-source device 11 includes apertures 113R, 113G, and 113B, an optical-path branching element 117, a condenser lens 118, and a light receiver 119. The apertures 113R, 113G, and 113B are disposed between the coupling lenses 112R, 112G, and 112B and the combiners 114, 115, and 116, and shape the laser beams (light flux) that are coupled by the coupling lenses 112R, 112G, and 112B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The optical-path branching element 117 transmits some of the laser beams (light flux) exited through the combiner 116, and guides the laser beams (light flux) to the filter 307 as illustrated in FIG. 7. In parallel with that, the optical-path branching element 117 reflects different some of the laser beams (light flux) towards the condenser lens 118. The light receiver 119 is an example of a photodetector that detects the irradiation light that is emitted from the combiner 116 that is an example of a light source, and detects the radiation intensity of the laser beams that are concentrated by the condenser lens 118. The control unit 175 as described above with reference to FIG. 10 controls the intensity of the laser beams that emitted from the light-source device 11, based on the information about the intensity of the laser beams detected by the light receiver 119.

Figure 12:
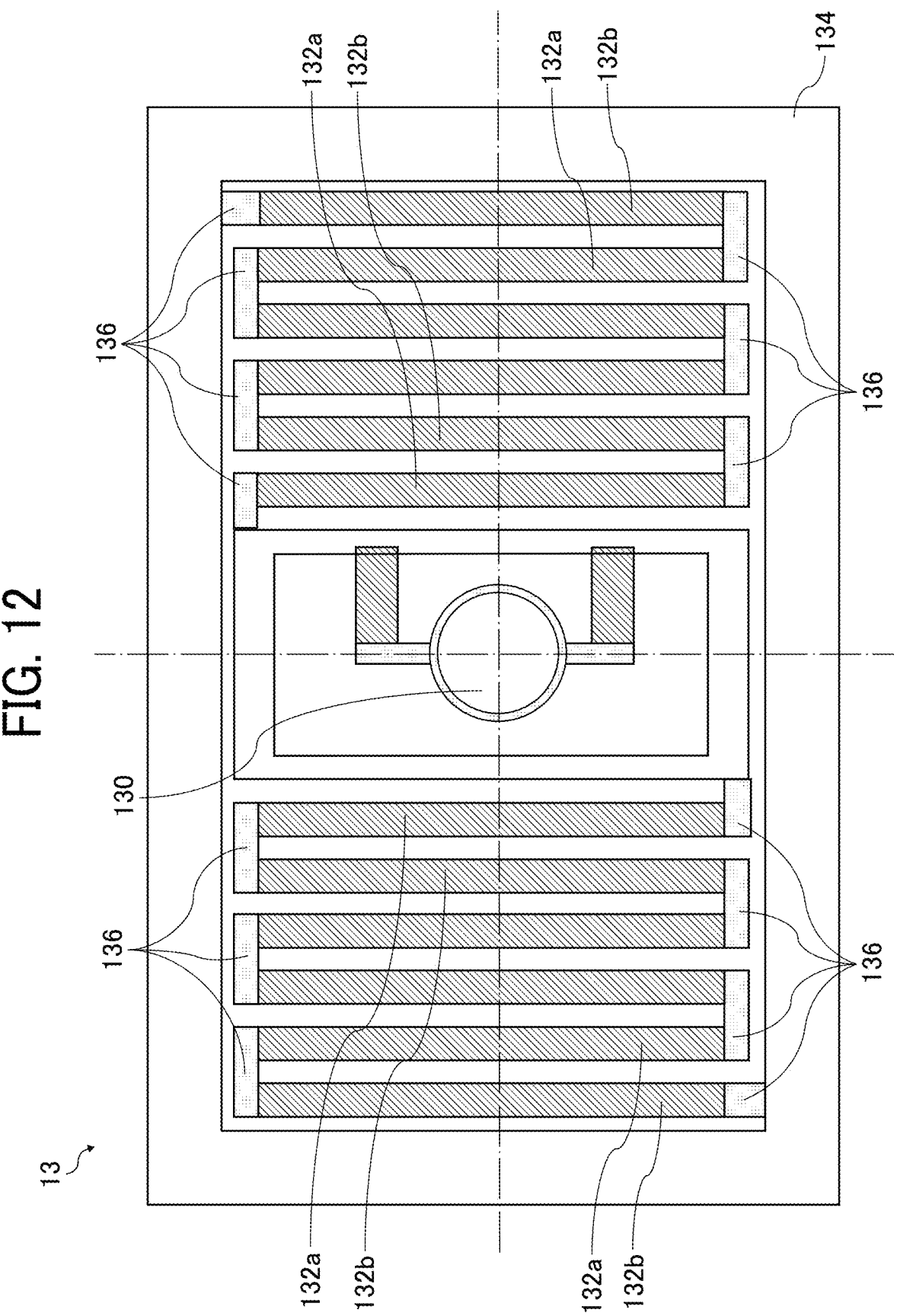
FIG. 12 is a diagram illustrating a specific configuration of a light deflector according to an embodiment of the present disclosure.

FIG. 12 is a diagram illustrating a specific configuration of the light deflector 13 according to the present embodiment.

The light deflector 13 is a MEMS mirror produced by semiconductor processing, and includes a mirror 130, serpentine beams 132a and 132b, a frame 134, and a piezoelectric member 136. The light deflector 13 performs scanning in the main scanning direction that is an example of a first scanning direction and in the sub-scanning direction that is an example of a second scanning direction intersecting with the first scanning direction.

The mirror 130 has a reflection plane that reflects the laser beams emitted from the light-source device 11 towards the screen 15 side. In the light deflector 13, a pair of first and second serpentine beams 132a and 132b are formed across the mirror 130. Each of the pair of first and second serpentine beams 132a and 132b has a plurality of turning portions. Each of these turning portions is configured by the first serpentine beam 132a and the second serpentine beam 132b that are arranged alternately. Each of the pair of serpentine beams 132a and 132b is supported by the frame 134. The piezoelectric member 136 is disposed such that the first serpentine beam 132a and the second serpentine beam 132b, which are adjacent to each other, are coupled to each other. The piezoelectric member 136 applies different levels of voltage to the first serpentine beam 132a and the second serpentine beam 132b to bend each of the first serpentine beam 132a and the second serpentine beam 132b differently.

As a result, the first serpentine beam 132a and the second serpentine beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

Figure 13:
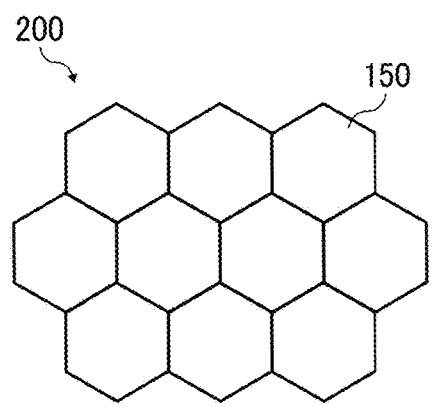
FIG. 13 is a diagram illustrating a specific configuration of a screen according to an embodiment of the present disclosure.

FIG. 13 is a diagram illustrating a specific configuration of the screen 15 according to the present embodiment.

The laser beams emitted from the LD 1007 that configures a part of the light-source device 11 on the screen 15. The screen 15 serves as a divergent part that diverges the laser beams at a predetermined divergence angle. As an example configuration in which a plurality of curved portions through which the light diverges are provided, the screen 15 as illustrated in FIG. 13 has a microlens-array structure in which a plurality of hexagonal-shaped microlenses 150 are arranged with no gap therebetween. The microlenses 150 are convex portions that are an example of the curved portions. The lens diameter of each one of the microlenses 150 (the distance between two sides that are opposed to each other) is about 200 micrometers (μm). As the microlenses 150 of the screen 15 have a hexagonal shape, the multiple microlenses 150 can be arrayed with high density. The microlens array 200 and the microlenses 150 according to the present embodiment will be described later in detail.

Figure 14A:
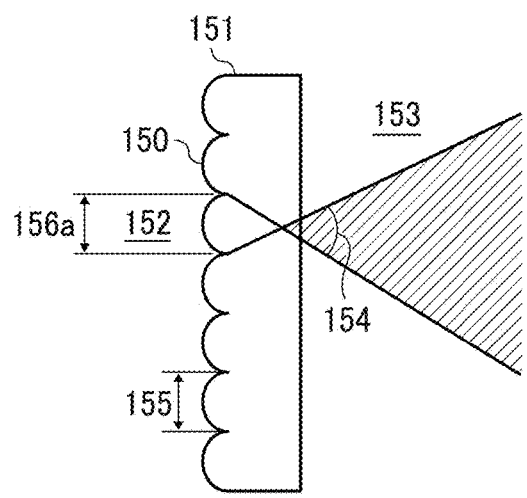
FIG. 14A and FIG. 14B are diagrams illustrating a difference in operation due to the differences in sizes of the diameter of incident light flux and the lens diameter in a microlens array, according to an embodiment of the present disclosure.
Figure 14B:
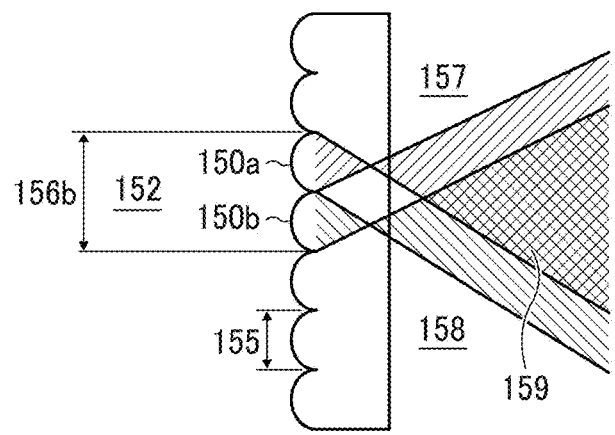

FIG. 14A and FIG. 14B are diagrams illustrating a difference in operation due to differences in sizes of the diameter of incident light flux and the lens diameter in the microlens array, according to the present embodiment.

As illustrated in FIG. 14A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the incident light 152 can diverge through the screen 15 at a desired divergence angle 154. The Lens diameter 155 at which the microlenses 150 are arranged is designed to be wider than a diameter 156a of the incident light 152. Accordingly, the screen 15 does not cause interference among the lenses, and interfering noise can be prevented from occurring.

FIG. 14B is a diagram illustrating the optical paths of diverging lights when a diameter 156b of the incident light 152 is twice wider than the lens diameter 155 at which the microlenses 150 are arranged.

The incident light 152 is incident on two microlenses 150a and 150b, and these two microlenses 150a and 150b produce two diverging lights 157 and 158, respectively. In such cases, lights may interfere with each other as two diverging lights exist in an area 159. Such an interference between two diverging lights (coherent light) is visually recognized as an interfering noise by an observer.

In view of the above circumstances, the lens diameter 155 at which the microlenses 150 are arranged is designed to be wider than the diameter 156b of the incident light 152 in order to reduce the interfering noise. A configuration with convex lenses is described as above with reference to FIG. 14A and FIG. 14B. However, no limitation is indicated thereby, and advantageous effects can be expected in a similar manner in a configuration with concave lenses.

Figure 15:
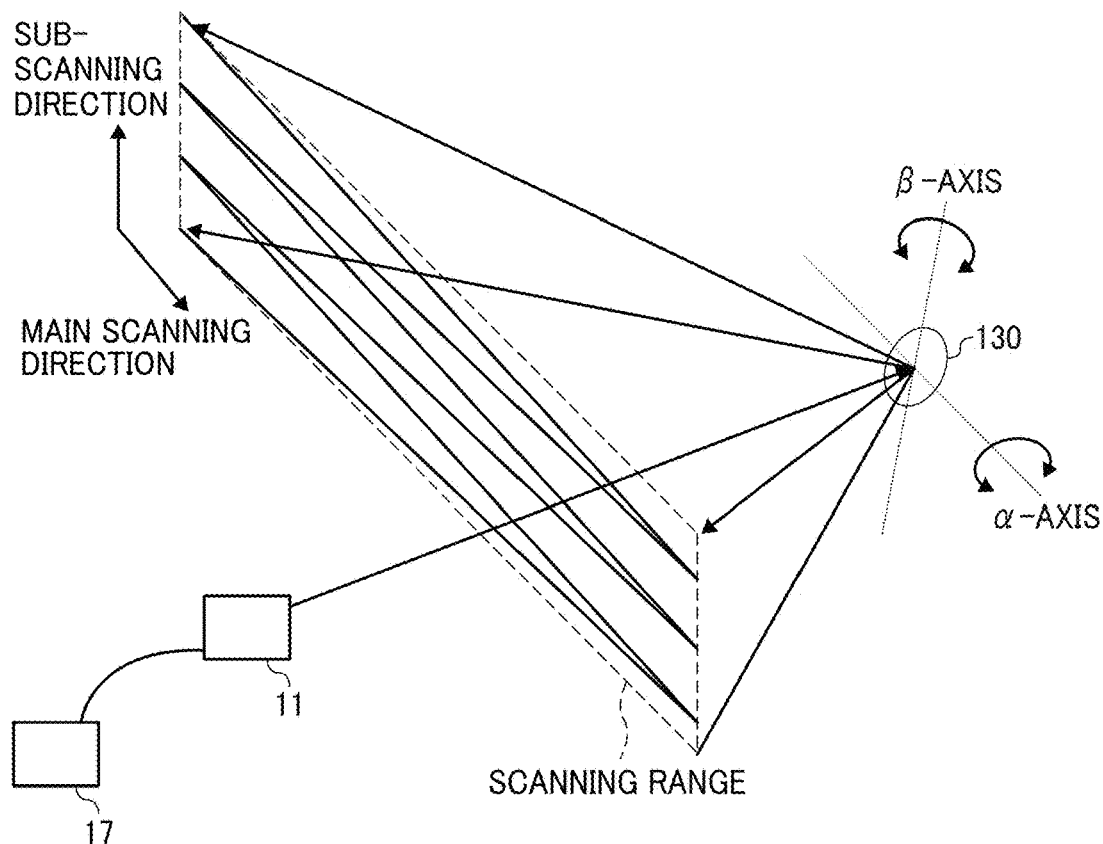
FIG. 15 is a diagram illustrating the relation between a mirror of a light deflector and the scanning range, according to an embodiment of the present disclosure.

FIG. 15 is a diagram illustrating the relation between the mirror 130 of the light deflector 13 and the scanning range, according to the present embodiment.

The FPGA 1001 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 15, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

In the present embodiment, the entire area to be scanned by the light deflector 13 may be referred to as a scanning range. The scanning beam scans (two-way scans) the scanning range of the screen 15 in an oscillating manner in the main scanning direction at a high frequency of about 20,000 to 40,000 hertz (Hz), and scans (one-way scans) the scanning range of the screen 15 in the sub-scanning direction at a low frequency of about a few tens of Hz. In other words, the light deflector 13 performs raster scanning on the screen 15. In this configuration, the display device 10 controls the light emission of the multiple light-source elements according to the scanning position (the position of the scanning beam). Accordingly, an image can be drawn on a pixel-by-pixel basis and a virtual image can be displayed.

As described above, the sub-scanning cycle is about a few tens of Hz.

Accordingly, the length of time to draw an image of one frame, i.e., the length of time to scan one frame (one cycle of two-dimensional scanning) is a few tens of millisecond (msec). For example, assuming that the main-scanning cycle and the sub-scanning cycle are 20,000 Hz and 50 Hz, respectively, the length of time to scan one frame is 20 msec.

Figure 16:
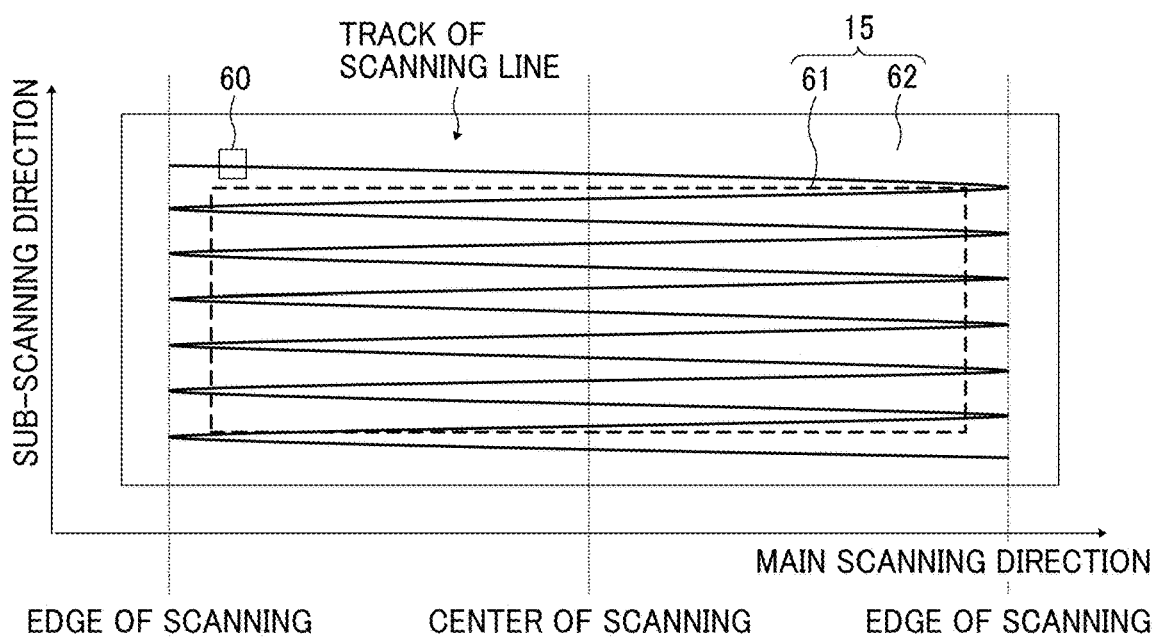
FIG. 16 is a diagram illustrating the track of a scanning line when two-dimensional scanning is performed, according to an embodiment of the present disclosure.

FIG. 16 is a diagram illustrating the track of a scanning line when two-dimensional scanning is performed, according to the present embodiment.

As illustrated in FIG. 16, the screen 15 includes an image area 61 (i.e., an effective scanning area) and a frame area 62 that surrounds the image area 61. The image area 61 is irradiated with the light that is modulated according to the image data, and the intermediate image 40 is drawn on the image area 61.

In the present embodiment, the scanning range includes the image area 61 and a part of the frame area 62 (i.e., a portion around the periphery of the image area 61) on the screen 15. In FIG. 16, the track of the scanning line in the scanning range is indicated by a zigzag line. For the sake of explanatory convenience, the number of scanning lines in FIG. 16 is less than the actual number of scanning lines.

As described above, the screen 15 is configured by a transmissive optical element such as the microlens array 200 that diffuses light. In the present embodiment, the shape of the image area 61 is rectangular or planar. However, no limitation is intended thereby, and the shape of the image area 61 may be polygonal or curved. Further, in some embodiments, the screen 15 may be a reflective optical element such as a micromirror array that diffuses light, depending on the design or layout of the display device 10. In the following description of the present embodiment, it is assumed that the screen 15 is configured by the microlens array 200.

The screen 15 is provided with a synchronous detection system 60 that includes a light receiver disposed at the edges of the image area 61 (a part of the frame area 62) in the scanning range. In FIG. 16, the synchronous detection system 60 is disposed on the −X and +Y side of the image area 61. More specifically, the synchronous detection system 60 is disposed at a corner on the +Y side. The synchronous detection system 60 detects the operation of the light deflector 13 and outputs, to the FPGA 1001, a synchronizing signal that determines the start timing of scanning or the end timing of scanning.

Figure 17:
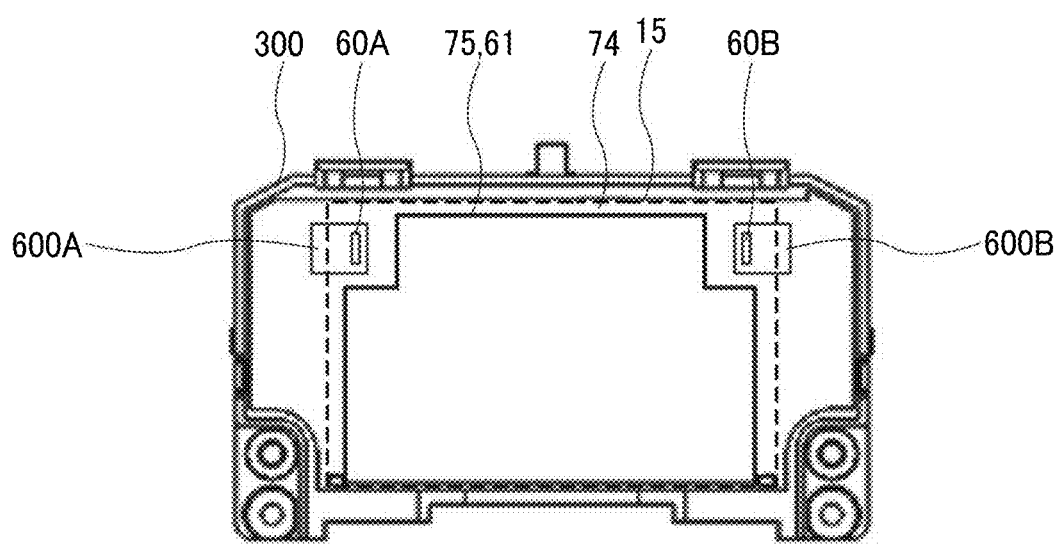
FIG. 17 is a plan view of a screen unit viewed from the upstream side of an optical path, according to an embodiment of the present disclosure.

FIG. 17 is a plan view of the screen unit 300 viewed from the upstream side of the optical path, according to the present embodiment.

The screen unit 300 is provided with a shielding part 74, which shields a part of the scanning light that is scanned by the light deflector 13, on the upstream side of the screen 15 on the optical path. The shielding part 74 has a window 75 through which the scanning light passes, and the area of the window 75 overlaps with the image area 61. In the shielding part 74, synchronous detection systems 60A and 60B (each of which is an example of a photodetector), each of which is configured by a photodiode (PD), are disposed on the upstream side of the optical path. Irradiation fields 600A and 600B indicate the areas irradiated with the scanning light for the synchronous detection systems 60A and 60B, respectively.

Instead of the position of the shielding part 74 on the optical path, a shielding part for shielding some of the scanning light that is scanned by the light deflector 13 may be arranged around the first mirror 401 or right after the light deflector 13 on the downstream side of the optical path.

Figure 18:
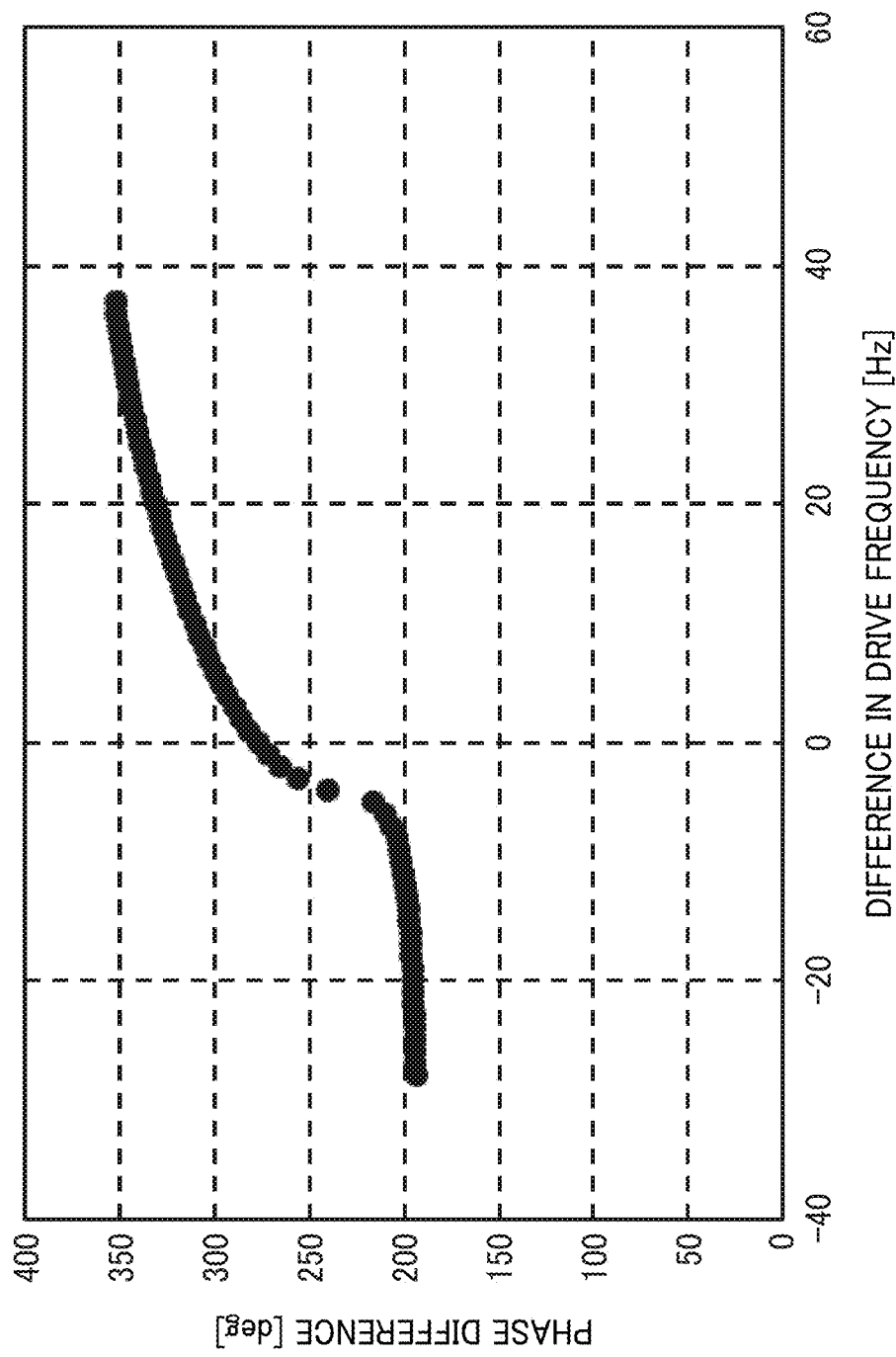
FIG. 18 is a diagram illustrating the relation between a phase difference and the difference in drive frequency on a mirror, according to an embodiment of the present disclosure.

FIG. 18 is a diagram illustrating the relation between a phase difference and the difference in drive frequency on a mirror 130, according to the present embodiment.

In the mirror 130 of the light deflector 13 as illustrated in FIG. 12 and FIG. 15, the resonance frequency when the mirror 130 oscillates changes due to the atmospheric temperature and the aged deterioration. Moreover, the phase difference of the oscillating mirror 130 (=actual phase of mirror−phase of mirror driving voltage) changes due to the difference in drive frequency (=drive frequency−resonance frequency) of the mirror 130. As illustrated in FIG. 18, there is a positive correlation between the difference in drive frequency on a mirror 130 and the Phase difference.

FIG. 19A and FIG. 19B are diagrams illustrating the effect produced by the difference in drive frequency on a mirror 130, according to the present embodiment.

In FIG. 19A and FIG. 19B, the positions at which the screen 15 and the shielding part 74 are arranged on the optical path are illustrated.

For example, a scanning line 630, which is implemented as the light is two-dimensionally scanned by the light deflector 13 in the main scanning direction and the sub-scanning direction, moves from top to bottom in the sub-scanning direction as illustrated in FIG. 19A and FIG. 19B. More specifically, the scanning line 630 moves from a top-right side of the image area 61 to the shielding part 74 on the left side, and then turns in the shielding part 74 and moves to a bottom-right side of the image area 61. The synchronous detection system 60A is disposed on the shielding part 74, and an area in which the synchronous detection system 60A is disposed is referred to as a first detection field 60A in the following description. The synchronous detection system 60A detects the irradiation light when the scanning line 630 passes through the first detection field 60A. Note that the scanning line 630 may move from bottom to top in the sub-scanning direction as illustrated in FIG. 19A and FIG. 19B.

The control unit 175 as described above with reference to FIG. 10 controls the light deflector 13, and turns on or turns off the light-source device 11. More specifically, the control unit 175 turns on the light-source device 11 at the timing when the scanning line 630 passes through the first detection field 60A.

FIG. 19A illustrates a state in which there is no difference in drive frequency (phase difference) on the mirror 130. The first irradiation field 601A and the second irradiation field 602A are included in the irradiation field 600A as illustrated in FIG. 17, and each one of the first irradiation field 601A and the second irradiation field 602A overlaps with the first detection field 60A.

The control unit 175 controls the drive frequency on the mirror 130 or the timing at which the light-source device 11 is turned on or turned off based on the timing at which the synchronous detection systems 60A detects the irradiation light on the first irradiation field 601A and the timing at which the synchronous detection systems 60A detects the irradiation light on the second irradiation field 602A, to adjust the position or size of an image that is formed on the image area 61.

By contrast, FIG. 19B illustrates a state in which there is a difference in drive frequency (phase difference) on the mirror 130. Each one of the first irradiation field 601A and the second irradiation field 602A does not overlap with the first detection field 60A.

The control unit 175 cannot control the drive frequency on the mirror 130 or the timing at which the light-source device 11 is turned on or turned off based on the timing at which the synchronous detection systems 60A detects the irradiation light on the first irradiation field 601A and the timing at which the synchronous detection systems 60A detects the irradiation light on the second irradiation field 602A, and thus cannot adjust the position or size of an image that is formed on the image area 61.

In the state as illustrated in FIG. 19B, the phase difference may be adjusted by moving the first irradiation field 601A and the second irradiation field 602A until these irradiation fields overlap with the first detection field 60A.

Figure 20A:
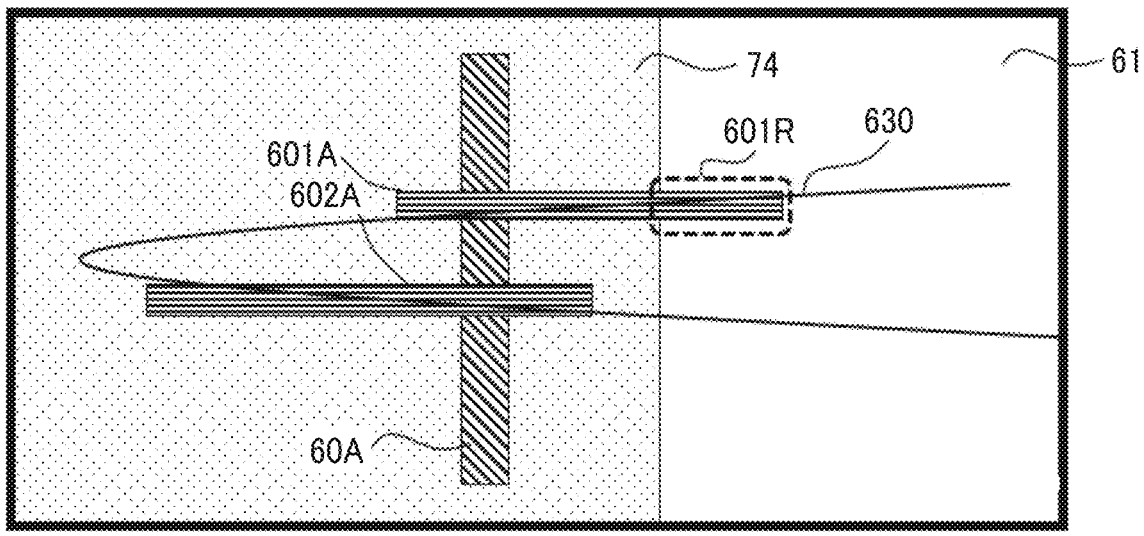
FIG. 20A and FIG. 20B are diagrams each illustrating a method of adjusting a phase difference, according to a control sample of an embodiment of the present disclosure.
Figure 20B:
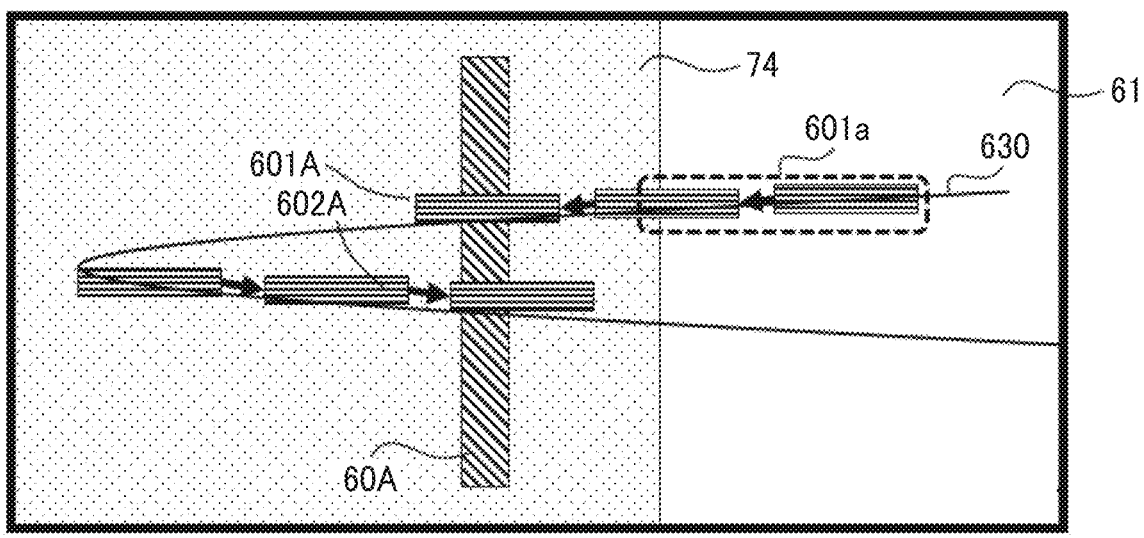

FIG. 20A and FIG. 20B are diagrams each illustrating a method of adjusting a phase difference, according to a control sample of the above embodiment of the present disclosure.

As described above with reference to FIG. 19B, when each one of the first irradiation field 601A and the second irradiation field 602A does not overlap with the first detection field 60A, the relative positions of the first irradiation field 601A and the second irradiation field 602A need to be changed.

FIG. 20A is a diagram illustrating a method of making each one of the first irradiation field 601A and the second irradiation field 602A overlap with the first detection field 60A by extending the length of time during which the light-source device 11 is turned on to increase the size of the first irradiation field 601A and the second irradiation field 602A, according to the present control sample of the above embodiment.

FIG. 20B is a diagram illustrating a method of making each one of the first irradiation field 601A and the second irradiation field 602A overlap with the first detection field 60A by changing the drive frequency of the mirror 130 or the timing at which the light-source device 11 is turned on to move the first irradiation field 601A and the second irradiation field 602A, according to the present control sample of the above embodiment.

However, in FIG. 20A, a part 601R of the first irradiation field 601A sticks out from the shielding part 74 and enters the image area 61, and such entry affects the quality of an image in the image area 61. In FIG. 20B, the first irradiation field 601A enters the image area 61 while moving (such moving is indicated by a reference sign "601a" in FIG. 20B), and such entry affects the quality of an image in the image area 61.

In the preset embodiments of the present disclosure, each one of the first irradiation field 601A and the second irradiation field 602A overlaps with the first detection field 60A while preventing each one of the first irradiation field 601A and the second irradiation field 602A from entering the image area 61.

Figure 21A:
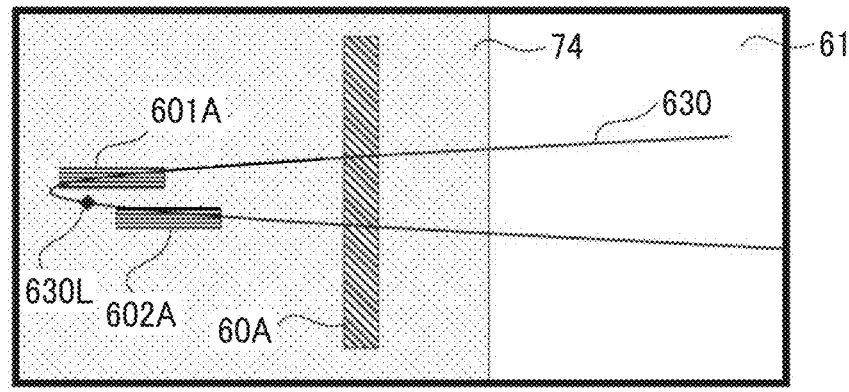
FIG. 21A, FIG. 21B, and FIG. 21C are diagrams each illustrating a method of adjusting a phase difference, according to an embodiment of the present disclosure.
Figure 21B:
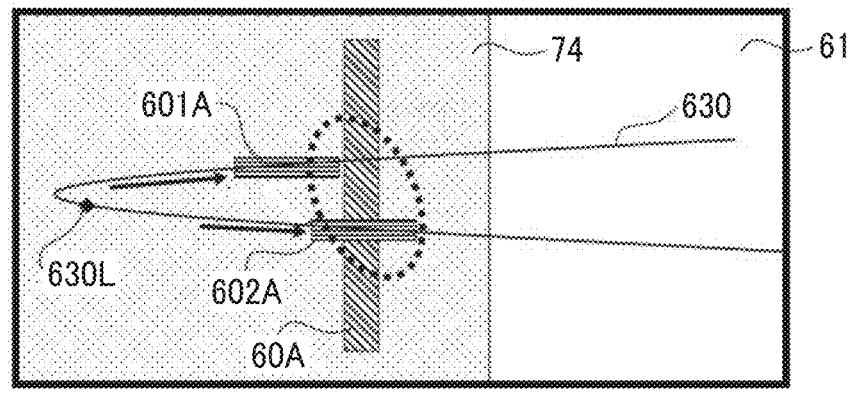
Figure 21C:
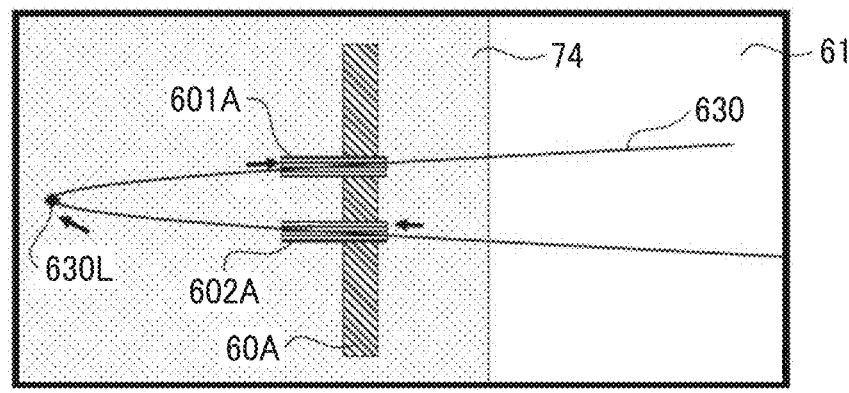

FIG. 21A, FIG. 21B, and FIG. 21C are diagrams each illustrating a method of adjusting a phase difference, according to the present embodiment.

In FIG. 21A, FIG. 21B, and FIG. 21C, the positions at which the screen 15 and the shielding part 74 are arranged on the optical path are illustrated.

As illustrated in FIG. 21A, the control unit 175 sets the first irradiation field 601A and the second irradiation field 602A with reference to the left end 630L (amplitude edge) of the scanning line 630 in the main scanning direction. The left end 630L of the scanning line 630 indicates the timing when the scanning line 630 turns in the main scanning direction under the condition that there is no difference in drive frequency (phase difference) on the mirror 130, and the control unit 175 causes, for example, the ROM 1003 to store such a timing.

The control unit 175 controls the timing at which the light-source device 11 is turned on and turned off such that each one of the first irradiation field 601A and the second irradiation field 602A is positioned between the left end 630L of the scanning line 630 and the first detection field 60A. In such a configuration, the control unit 175 controls the timing at which the light-source device 11 is turned on and turned off such that the length of time it takes for the scanning line 630 to pass through an edge of the first irradiation field 601A on the left end 630L side (i.e., the left end as illustrated in FIG. 21A) and then to reach the left end 630L becomes equivalent to the length of time it takes for the scanning line 630 to pass through the left end 630L and then to reach an edge of the second irradiation field 602A on the left end 630L side (i.e., the left end as illustrated in FIG. 21A).

FIG. 21A illustrates a state in which there is a difference in drive frequency (phase difference) on the mirror 130, and the left end 630L of the scanning line 630, which is stored in, for example, the ROM 1003 as controlled by the control unit 175, is displaced from the actual timing when the scanning line 630 turns in the main scanning direction.

Subsequently, as illustrated in FIG. 21B, the control unit 175 causes an edge of the first irradiation field 601A on the first detection field 60A side (an edge on the right side in FIG. 21B) and an edge of the second irradiation field 602A on the first detection field 60A side (an edge on the right side in FIG. 21B) to move to get close to the first detection field 60A from a position away from the first detection field 60A. Note that these edges move with the same amount of movement. A concrete method of moving such edges as above will be described later in detail.

The control unit 175 compare the timing at which the first irradiation field 601A overlaps with the first detection field 60A with the timing at which the second irradiation field 602A overlaps with the first detection field 60A. When these timings are different from each other, the control unit 175 determines that there is a phase difference due to the difference in drive frequency on the mirror 130.

Then, the control unit 175 determines the direction in which the left end 630L is misaligned from the actual timing at which the scanning line 630 turns, based on which one of the timing at which the first irradiation field 601A overlaps with the first detection field 60A and the timing at which the second irradiation field 602A overlaps with the first detection field 60A is earlier.

Assuming that the scanning line 630 moves from top to bottom in the sub-scanning direction as illustrated in FIG. 21B, the timing at which the second irradiation field 602A overlaps with the first detection field 60A is earlier than the other as indicated by a dotted line in FIG. 21B. Accordingly, the control unit 175 determines that the left end 630L is moved ahead of the actual timing at which the scanning line 630 turns.

As illustrated in FIG. 21C, the control unit 175 corrects, based on the above result of the determination, the timing of the left end 630L so as to be delayed and match the actual timing at which the scanning line 630 turns, and controls, for example, the ROM 1003 to store the corrected timing.

Due to such a configuration, as illustrated in FIG. 21C, each one of the first irradiation field 601A and the second irradiation field 602A overlaps with the first detection field 60A.

As described above with reference to FIG. 21A, FIG. 21B, and FIG. 21C, the first irradiation field 601A and the second irradiation field 602A move in the shielding part 74 to get close to the first detection field 60A from a position away from the first detection field 60A. Accordingly, the first irradiation field 601A and the second irradiation field 602A can be prevented from entering the image area 61.

As described above, in the present embodiment, each one of the first irradiation field 601A and the second irradiation field 602A overlaps with the first detection field 60A while preventing each one of the first irradiation field 601A and the second irradiation field 602A from entering the image area 61.

Accordingly, the control unit 175 can control the drive frequency on the mirror 130 or the timing at which the light-source device 11 is turned on or turned off based on the timing at which the synchronous detection systems 60A detects the irradiation light on the first irradiation field 601A and the timing at which the synchronous detection systems 60A detects the irradiation light on the second irradiation field 602A, to adjust the position or size of an image that is formed on the image area 61.

Figure 22:
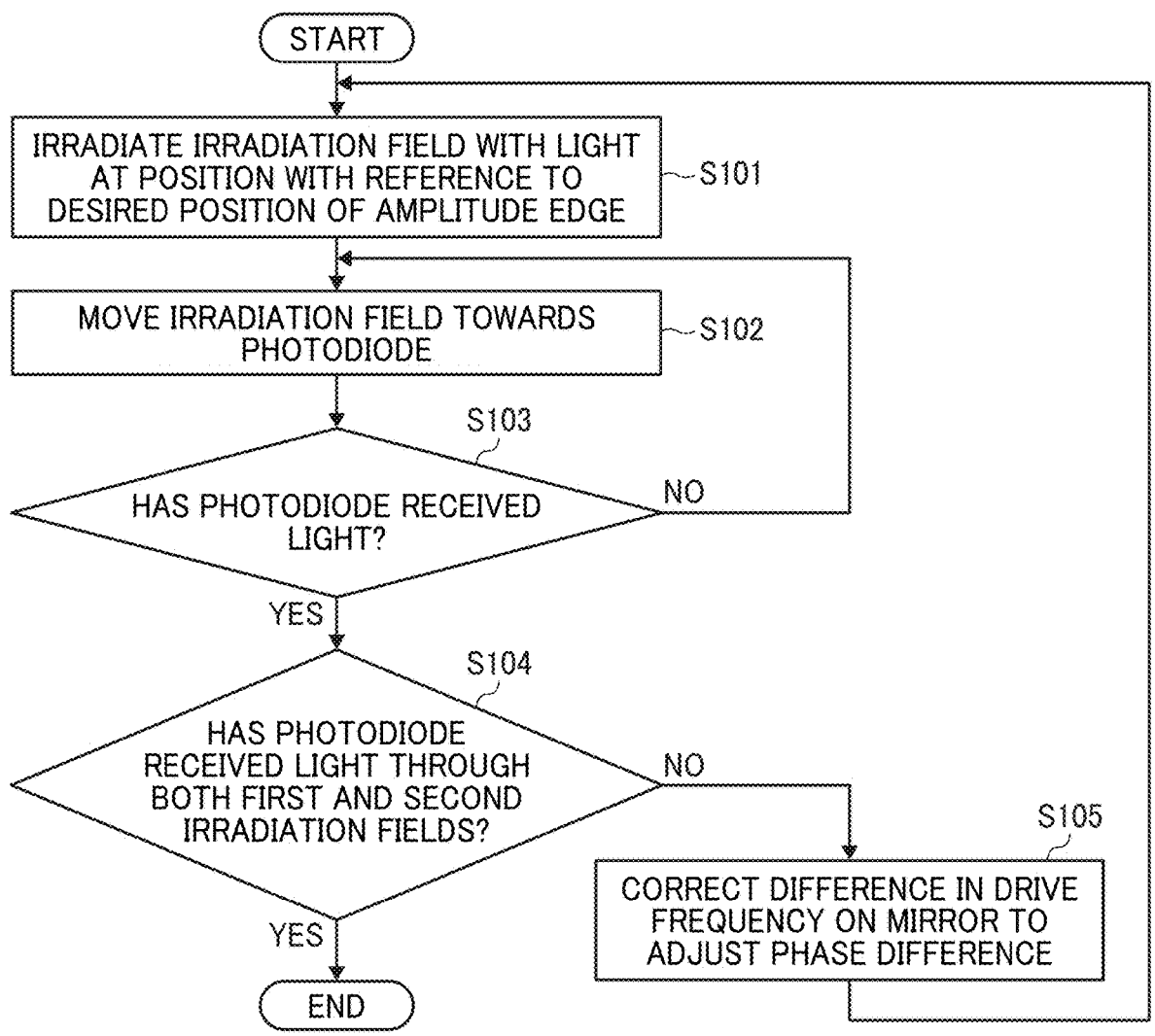
FIG. 22 is a flowchart of the processes performed by a control unit, according to an embodiment of the present disclosure.

FIG. 22 is a flowchart of the processes performed by the control unit 175, according to the present embodiment.

The control unit 175 adjusts the first irradiation field 601A and the second irradiation field 602A with reference to a desired position of an amplitude edge of the scanning line 630 in the main scanning direction (the left end 630L as illustrated in FIG. 21A, FIG. 21B, and FIG. 21C), and turns on the light-source device 11 in the first irradiation field 601A and the second irradiation field 602A (step S101). In this configuration, the control unit 175 controls the timing at which the light-source device 11 is turned on and turned off such that each one of the first irradiation field 601A and the second irradiation field 602A is positioned between a desired position of the amplitude edge and the synchronous detection systems (detection field) 60A. Moreover, the control unit 175 controls the timing at which the light-source device 11 is turned on and turned off such that the length of time that the irradiation of the first irradiation field 601A is turned off and then the scanning line 630 reaches a desired position of the amplitude edge becomes equivalent to the length of time that the scanning line 630 passes through a desired position of the amplitude edge and then the irradiation of the second irradiation field 602A is started.

Subsequently, the control unit 175 moves each one of the first irradiation field 601A and the second irradiation field 602A to get close to the synchronous detection system 60A (photodiode (PD)) by advancing the timing at which the irradiation of the first irradiation field 601A starts and delaying the timing at which the irradiation of the second irradiation field 602A is turned off (step S102). Note also that the length of time that the timing at which the irradiation of the first irradiation field 601A starts is advanced is equivalent to the length of time that the timing at which the irradiation of the second irradiation field 602A is turned off is delayed.

The control unit 175 determines whether the synchronous detection systems 60A has detected (received) the irradiation light through any one of the first irradiation field 601A and the second irradiation field 602A (step S103). When it is determined that no irradiation light is detected, the control unit 175 returns the process to the step S102, and further advances the timing at which the irradiation of the first irradiation field 601A starts and further delays the timing at which the irradiation of the second irradiation field 602A is turned off.

When it is determined in the step S103 that the synchronous detection system 60A has detected some of the irradiation light, the control unit 175 determines whether the irradiation light is simultaneously detected (received) through both the first irradiation field 601A and the second irradiation field 602A (step S104). When it is determined that the irradiation light is simultaneously detected through both the first irradiation field 601A and the second irradiation field 602A, the control unit 175 determines that there is no phase difference due to the difference in drive frequency on the mirror 130, and terminates the processes.

On the other hand, when it is determined that the irradiation light is not simultaneously detected through both the first irradiation field 601A and the second irradiation field 602A, the control unit 175 determines that there is a phase difference due to the difference in drive frequency on the mirror 130, and corrects the difference in drive frequency on the mirror 130 to adjust the phase difference (step S105). Then, the control unit 175 determines the direction (right or left as illustrated in FIG. 18) in which the difference in drive frequency on the mirror 130 is corrected, based on through which one of the first irradiation field 601A and the second irradiation field 602A the irradiation light is firstly detected.

Figure 23A:
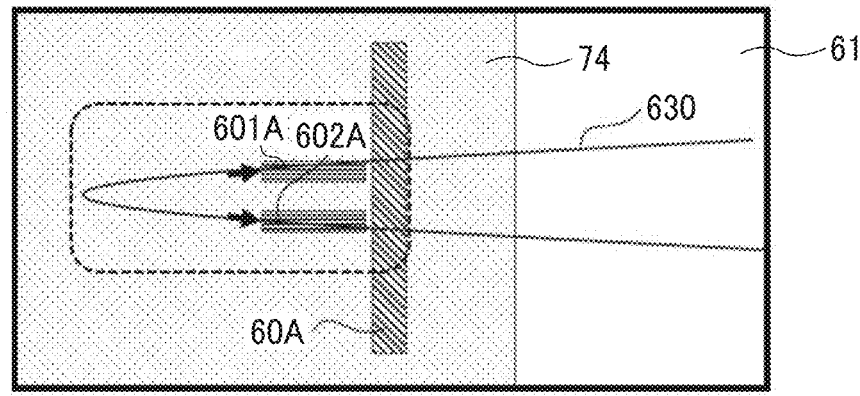
FIG. 23A, FIG. 23B, and FIG. 23C are diagrams each illustrating a method of moving an irradiation field, according to an embodiment of the present disclosure.
Figure 23B:
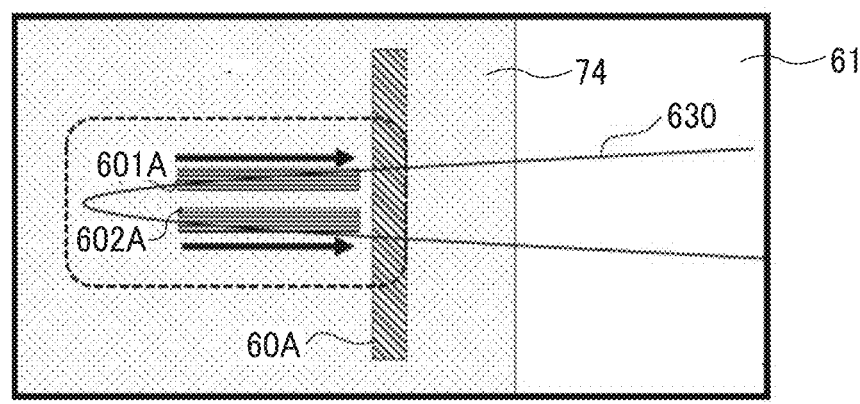
Figure 23C:
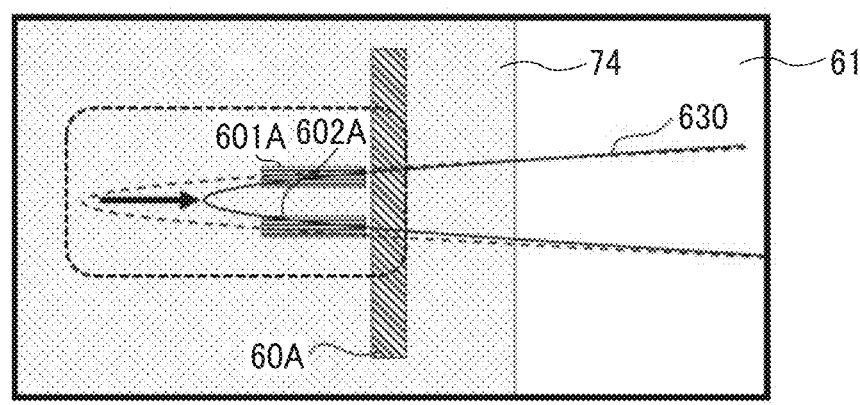

FIG. 23A, FIG. 23B, and FIG. 23C are diagrams each illustrating a method of moving the first irradiation field 601A and the second irradiation field 602A, according to the present embodiment.

In FIG. 23A, the control unit 175 advances both the timing at which the irradiation of the first irradiation field 601A starts and the timing at which the irradiation of the first irradiation field 601A is turned off, and delays both the timing at which the irradiation of the second irradiation field 602A starts and the timing at which the irradiation of the second irradiation field 602A is turned off. Accordingly, as illustrated in FIG. 21B, an edge of the first irradiation field 601A on the first detection field 60A side (an edge on the right side) and an edge of the second irradiation field 602A on the first detection field 60A side (an edge on the right side) move to get close to the first detection field 60A from a position away from the first detection field 60A.

As illustrated in FIG. 23B, the control unit 175 advances the timing at which the irradiation of the first irradiation field 601A starts without changing the timing at which the irradiation of the first irradiation field 601A is turned off, and delays the timing at which the irradiation of the second irradiation field 602A is turned off without changing the timing at which the irradiation of the second irradiation field 602A starts. Accordingly, as illustrated in FIG. 21B, an edge of the first irradiation field 601A on the first detection field 60A side (an edge on the right side) and an edge of the second irradiation field 602A on the first detection field 60A side (an edge on the right side) move to get close to the first detection field 60A from a position away from the first detection field 60A.

In FIG. 23C, the control unit 175 reduces the amplitude of the scanning line 630 in the main scanning direction without changing the relative positions of the first irradiation field 601A and the second irradiation field 602A with reference to the scanning line 630. Accordingly, as illustrated in FIG. 21B, an edge of the first irradiation field 601A on the first detection field 60A side (an edge on the right side) and an edge of the second irradiation field 602A on the first detection field 60A side (an edge on the right side) move to get close to the first detection field 60A from a position away from the first detection field 60A.

In FIG. 23A, FIG. 23B, and FIG. 23C, the first irradiation field 601A and the second irradiation field 602A move within the area indicated by a dotted line within the shielding part 74, and do not enter the image area 61.

Figure 24A:
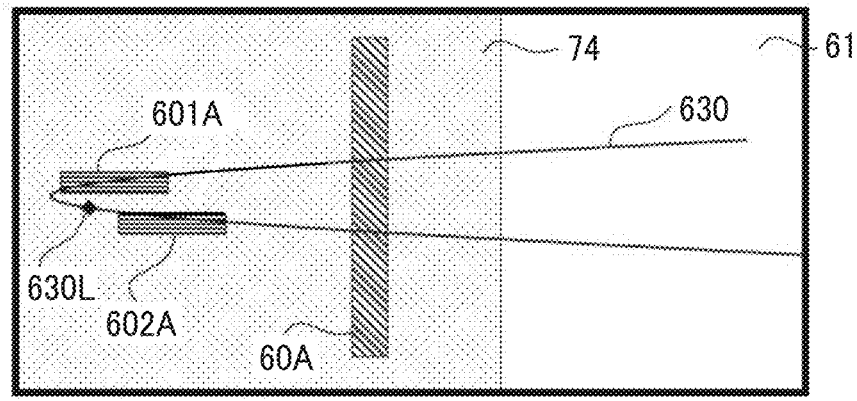
FIG. 24A, FIG. 24B, and FIG. 24C are diagrams each illustrating a first modification of the method of adjusting a phase difference as illustrated in FIG. 21A, FIG. 21B, and FIG. 21C.
Figure 24B:
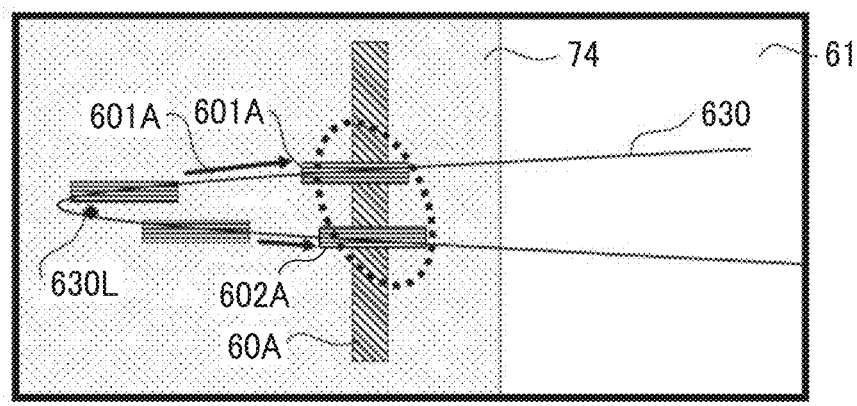
Figure 24C:
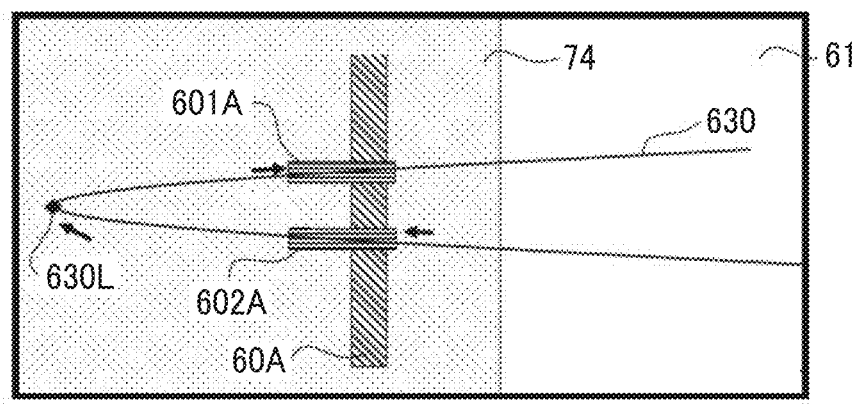

FIG. 24A, FIG. 24B, and FIG. 24C are diagrams each illustrating a first modification of the method of adjusting a phase difference as illustrated in FIG. 21A, FIG. 21B, and FIG. 21C.

FIG. 24A is equivalent to FIG. 21A.

In a similar manner to FIG. 21B, as illustrated in FIG. 24B, the control unit 175 causes an edge of the first irradiation field 601A on the first detection field 60A side (an edge on the right side in FIG. 24B) and an edge of the second irradiation field 602A on the first detection field 60A side (an edge on the right side in FIG. 24B) to move to get close to the first detection field 60A from a position away from the first detection field 60A. A concrete method of moving such edges as above is as described above with reference to FIG. 23A, FIG. 23B, and FIG. 23C.

In a state as indicated by a dotted line in FIG. 24B, the control unit 175 compares the amount of movement when the first irradiation field 601A moves until the first irradiation field 601A overlaps with the first detection field 60A with the amount of movement when the second irradiation field 602A moves until the second irradiation field 602A overlaps with the first detection field 60A. When these amounts of movement are different from each other, the control unit 175 determines that there is a phase difference due to the difference in drive frequency on the mirror 130.

Moreover, the control unit 175 determines the direction in which the left end 630L is misaligned from the actual timing at which the scanning line 630 turns, based on a larger one of the amount of movement when the first irradiation field 601A moves until the first irradiation field 601A overlaps with the first detection field 60A and the amount of movement when the second irradiation field 602A moves until the second irradiation field 602A overlaps with the first detection field 60A.

Assuming that the scanning line 630 moves from top to bottom in the sub-scanning direction, as illustrated in FIG. 24B, the control unit 175 determines that the left end 630L is moved ahead of the actual timing at which the scanning line 630 turns as the amount of movement when the second irradiation field 602A moves until the second irradiation field 602A overlaps with the first detection field 60A is smaller than the other amount of movement.

As illustrated in FIG. 24C, the control unit 175 corrects, based on the above result of the determination, the timing of the left end 630L so as to be delayed to match the actual timing at which the scanning line 630 turns, and controls, for example, the ROM 1003 to store the corrected timing.

Due to such a configuration, as illustrated in FIG. 24C, each one of the first irradiation field 601A and the second irradiation field 602A overlaps with the first detection field 60A.

As described above with reference to FIG. 24A, FIG. 24B, and FIG. 24C, the first irradiation field 601A and the second irradiation field 602A move in the shielding part 74 to get close to the first detection field 60A from a position away from the first detection field 60A. Accordingly, the first irradiation field 601A and the second irradiation field 602A can be prevented from entering the image area 61.

As described above, in the present modification of the embodiment of the present disclosure, each one of the first irradiation field 601A and the second irradiation field 602A overlaps with the first detection field 60A while preventing each one of the first irradiation field 601A and the second irradiation field 602A from entering the image area 61.

Figure 25:
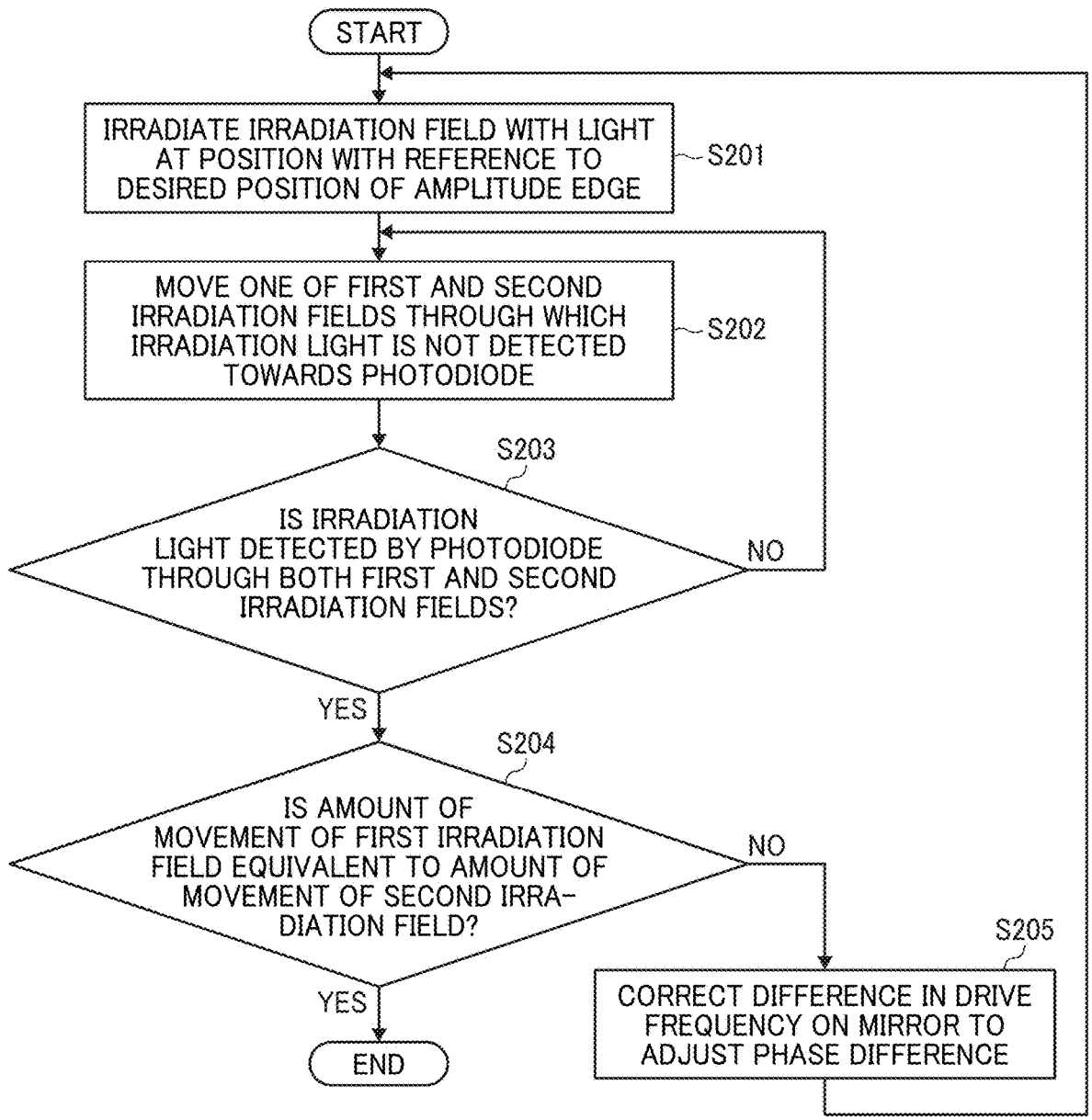
FIG. 25 is a flowchart of the processes performed by the control unit 175, according to the first modification of an embodiment as illustrated in FIG. 24A, FIG. 24B, and FIG. 24C.

FIG. 25 is a flowchart of the processes performed by the control unit 175, according to the first modification of the above embodiment as illustrated in FIG. 24A, FIG. 24B, and FIG. 24C.

Firstly, the control unit 175 performs the process equivalent to the step S101 as depicted in FIG. 22 (step S201).

Subsequently, the control unit 175 advances the timing at which the irradiation of the first irradiation field 601A starts when the irradiation light on the first irradiation field 601A is not detected (received) by the synchronous detection system (photodiode (PD)) 60A, and delays the timing at which the irradiation of the first irradiation field 601A is turned off when the irradiation light on the second irradiation field 602A is not detected (received) by the synchronous detection system (photodiode (PD)) 60A. Accordingly, each one of the first irradiation field 601A and the second irradiation field 602A gets close to the synchronous detection system 60A (step S202).

The control unit 175 determines whether the synchronous detection systems 60A has detected the irradiation light through both the first irradiation field 601A and the second irradiation field 602A (step S203). When it is determined that irradiation light is not detected through both the first irradiation field 601A and the second irradiation field 602A, the control unit 175 returns the process to the step S202, and further advances the timing at which the irradiation of the first irradiation field 601A starts when the irradiation light on the first irradiation field 601A is not detected by the synchronous detection system 60A and further delays the timing at which the irradiation of the first irradiation field 601A is turned off when the irradiation light on the second irradiation field 602A is not detected by the synchronous detection system 60A.

When both the irradiation lights are detected by the synchronous detection system 60A in the step S203, the control unit 175 determines whether the amount of movement of the first irradiation field 601A is equivalent to the amount of movement of the second irradiation field 602A (step S204). When it is determined that the amount of movement of the first irradiation field 601A is equivalent to the amount of movement of the second irradiation field 602A, the control unit 175 determines that there is no phase difference due to the difference in drive frequency on the mirror 130, and terminates the processes.

On the other hand, when the amount of movement of the first irradiation field 601A is not equivalent to the amount of movement of the second irradiation field 602A, the control unit 175 determines that there is a phase difference due to the difference in drive frequency on the mirror 130, and corrects the difference in drive frequency on the mirror to adjust the phase difference (step S205). Then, the control unit 175 determines the direction (right or left as illustrated in FIG. 18) in which the difference in drive frequency on the mirror 130 is corrected, based on which one of the amount of movement of the first irradiation field 601A and the amount of movement of the second irradiation field 602A is larger.

FIG. 26A and FIG. 26B are diagram each illustrating a method of adjusting the first irradiation field 601A and the second irradiation field 602A, according to the present embodiment.

As illustrated in FIG. 21A, FIG. 21B, FIG. 21C, FIG. 24A, FIG. 24B, and FIG. 24C, the control unit 175 controls the timing at which the light-source device 11 is turned on and turned off such that each one of the first irradiation field 601A and the second irradiation field 602A is positioned between the left end 630L of the scanning line 630 and the first detection field 60A.

In this configuration, as illustrated in FIG. 21A, FIG. 21B, FIG. 21C, FIG. 24A, FIG. 24B, and FIG. 24C, under the condition that there is some difference in drive frequency (phase difference) on the mirror 130, the left end 630L of the scanning line 630, which is stored in, for example, the ROM 1003 as controlled by the control unit 175, is displaced from the actual timing when the scanning line 630 turns in the main scanning direction. When the amount of displacement is too large, in the initial state as illustrated in FIG. 21A and FIG. 24A, it becomes difficult to set the first irradiation field 601A and the second irradiation field 602A so as not to overlap with the first detection field 60A.

In order to handle such a situation, in the embodiment of the present disclosure as illustrated in FIG. 26A and FIG. 26B, the first irradiation field 601A and the second irradiation field 602A are reliably configured in the initial state not to overlap with the first detection field 60A.

As illustrated in FIG. 26A, the control unit 175 controls the timing at which the light-source device 11 is turned on and turned off such that the position of an edge of the first irradiation field 601A on the left end 630L side will match the left end 630L and the position of an edge of the second irradiation field 602A on the left end 630L side will match the left end 630L. In other words, the control unit 175 turns off the irradiation of the first irradiation field 601A and starts the irradiation of the second irradiation field 602A at the timing when the scanning line 630 is at a desired position of the amplitude edge (left end 630L).

Due to such a configuration, the first irradiation field 601A and the second irradiation field 602A can reliably be set not to overlap with the first detection field 60A.

On the contrary, when the length of time that the irradiation of the first irradiation field 601A is turned off and then the scanning line 630 reaches a desired position of the amplitude edge and the length of time that the scanning line 630 passes through a desired position of the amplitude edge and then the irradiation of the second irradiation field 602A is started are to be increased, the first irradiation field 601A and the second irradiation field 602A cannot reliably be set not to overlap with the first detection field 60A. However, the processing time it takes for the first irradiation field 601A and the second irradiation field 602A to move from a position not overlapping with the first detection field 60A to a position overlapping with the first detection field 60A can be shortened.

As illustrated in FIG. 26B, in the initial state as illustrated in FIG. 21A and FIG. 24A, the control unit 175 increases the amplitude of the scanning line 630 in the main scanning direction without changing the relative positions of the first irradiation field 601A and the second irradiation field 602A with reference to the scanning line 630.

Due to such a configuration, the first irradiation field 601A and the second irradiation field 602A can reliably be set not to overlap with the first detection field 60A.

As illustrated in FIG. 26A and FIG. 26B, the first irradiation field 601A and the second irradiation field 602A are initially configured so as to stay within a dotted line indicated in the shielding part 74, and do not enter the image area 61.

FIG. 27A, FIG. 27B, FIG. 27C, and FIG. 27D are diagrams each illustrating the method of adjusting a phase difference as illustrated in FIG. 21A, FIG. 21B, and FIG. 21C, according to a second modification of the above embodiment of the present disclosure.

Figure 27A:
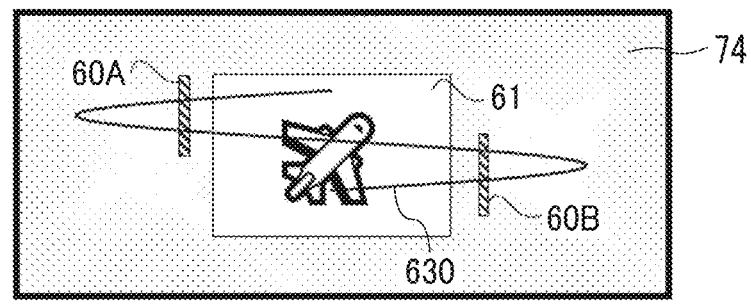
FIG. 27A, FIG. 27B, FIG. 27C, and FIG. 27D are diagrams each illustrating a second modification of the method of adjusting a phase difference as illustrated in FIG. 21A, FIG. 21B, and FIG. 21C.

In the present modification, as illustrated in FIG. 27A, correction is performed using the synchronous detection system 60A and the synchronous detection system 60B.

Each one of the synchronous detection system 60A and the synchronous detection system 60B is disposed on the shielding part 74. An area in which the synchronous detection system 60A is disposed is referred to as a first detection field 60A, and an area in which the synchronous detection system 60B is disposed is referred to as a second detection field 60B. The irradiation light when the scanning line 630 passes through the first detection field 60A and the second detection field 60B is detected.

Figure 27B:
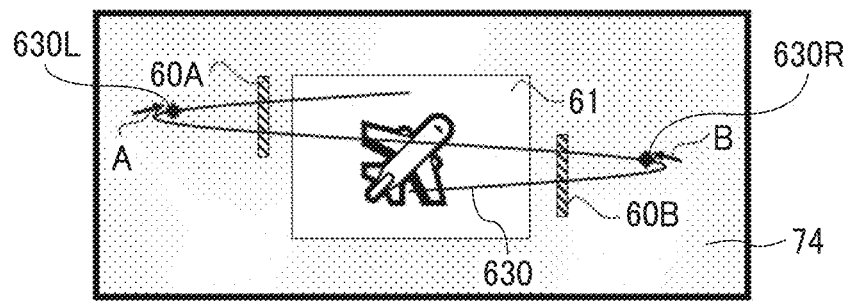

In FIG. 27B, the left end 630L of the scanning line 630 indicates the timing at which the scanning line 630 turns on the left side in the main scanning direction under the condition that there is no difference in drive frequency (phase difference) on the mirror 130, and the control unit 175 causes, for example, the ROM 1003 to store such a timing. Moreover, the right end 630R of the scanning line 630 indicates the timing at which the scanning line 630 turns on the right side in the main scanning direction under the condition that there is no difference in drive frequency (phase difference) on the mirror 130, and the control unit 175 causes, for example, the ROM 1003 to store such a timing.

FIG. 27B illustrates a state in which there is a difference in drive frequency (phase difference) on the mirror 130, and each of the left end 630L and the right end 630R of the scanning line 630, which are stored by the control unit 175, is displaced from the actual timing when the scanning line 630 turns in the main scanning direction.

In this configuration, the amount of misalignment between the left end 630L and the actual timing at which the scanning line 630 turns on the left side is equivalent to the amount of misalignment between the right end 630R and the actual timing at which the scanning line 630 turns on the right side.

Figure 27C:
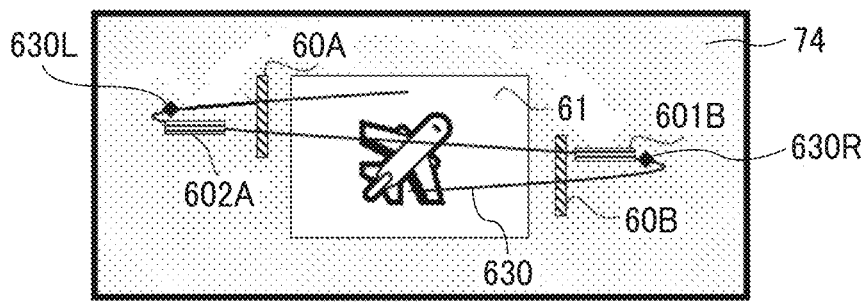

As illustrated in FIG. 27C, the control unit 175 sets the second irradiation field 602A with reference to the left end 630L of the scanning line 630 in the main scanning direction, and sets a first irradiation field 601B with reference to the right end 630R of the scanning line 630 in the main scanning direction.

The control unit 175 controls the timing at which the light-source device 11 is turned on and turned off such that the second irradiation field 602A is positioned between the left end 630L of the scanning line 630 and the first detection field 60A and such that the first irradiation field 601B is positioned between the right end 630R of the scanning line 630 and the second detection field 60B.

Further, the control unit 175 controls the timing at which the light-source device 11 is turned on and turned off such that the length of time it takes for the scanning line 630 to pass through a right edge of the first irradiation field 601B and then to reach the right end 630R as illustrated in FIG. 27C becomes equivalent to the length of time it takes for the scanning line 630 to pass through the left end 630L and then to reach a left edge of the second irradiation field 602A as illustrated in FIG. 27C.

Subsequently, in a similar manner to FIG. 21B, the control unit 175 causes an edge of the first irradiation field 601B on the second detection field 60B side (an edge on the left side in FIG. 27C) to move to get close to the second detection field 60B from a position away from the second detection field 60B, and causes an edge of the second irradiation field 602A on the first detection field 60A side (an edge on the right side in FIG. 27C) to move to get close to the first detection field 60A from a position away from the first detection field 60A.

In a similar manner to FIG. 21B, the control unit 175 compare the timing at which the first irradiation field 601B overlaps with the second detection field 60B with the timing at which the second irradiation field 602A overlaps with the first detection field 60A. When these timings are different from each other, the control unit 175 determines that there is a phase difference due to the difference in drive frequency on the mirror 130.

Subsequently, in a similar manner to FIG. 21C, the control unit 175 corrects, based on the above result of the determination, the timing of the left end 630L and the timing of the right end 630R so as to match the actual timing at which the scanning line 630 turns, and controls, for example, the ROM 1003 to store the corrected timings.

Figure 27D:
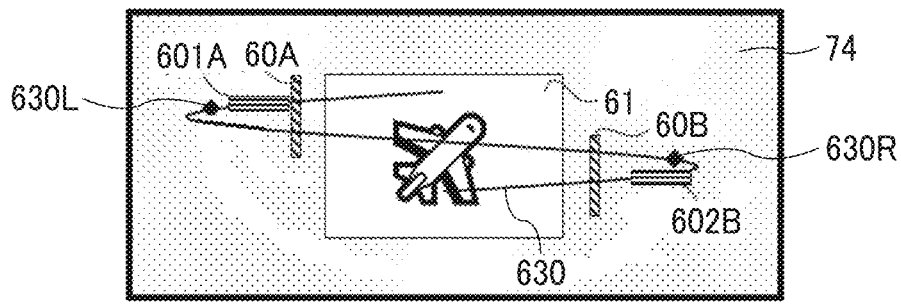

As illustrated in FIG. 27D, the control unit 175 may set a second irradiation field 602B with reference to the right end 630R of the scanning line 630 in the main scanning direction in addition to the first irradiation field 601A that is set with reference to the left end 630L of the scanning line 630 in the main scanning direction. In this case, the processes that are performed by the control unit 175 are equivalent to the processes that are performed in the case of FIG. 27C.

As described above, the display device 10 (an example of an optical scanner) according to an embodiment of the present disclosure is provided with the light deflector 13 that scans the irradiation light emitted from the light-source device 11 (an example of a light source) in the main scanning direction (an example of a first scanning direction) and the sub-scanning direction (an example of a second scanning direction) intersecting with the first scanning direction, and the synchronous detection system 60A (an example of a photodetector) configured that detects the irradiation light when the light deflector 13 scans a detection field. The light-source device 11 is turned on in the first irradiation field 601A that is scanned by the light deflector 13 from the first detection field 60A to one end in the main scanning direction (i.e., the left end 630L of the scanning line 630), and the light-source device 11 is turned on in the second irradiation field 602A that is scanned by the light deflector 13 from the end in the main scanning direction (i.e., the left end 630L of the scanning line 630) to the first detection field 60A. Together with that, an edge of the first irradiation field 601A on the first detection field 60A side is made to move to get close to the first detection field 60A from a position away from the first detection field 60A, and an edge of the second irradiation field 602A on the first detection field 60A side is made to move to get close to the first detection field 60A from a position away from the first detection field 60A.

Due to such a configuration, each one of the first irradiation field 601A and the second irradiation field 602A can be moved to overlap with the first detection field 60A while preventing each one of the first irradiation field 601A and the second irradiation field 602A from going beyond the first detection field 60A towards the other side of an end in the main scanning direction. Moreover, the drive frequency on the mirror 130 or the timing at which the light-source device 11 is turned on or turned off can be controlled based on the timing at which the irradiation light is detected on the first irradiation field 601A and the timing at which the irradiation light is detected on the second irradiation field 602A.

The first detection field 60A that is positioned at one end in the main scanning direction and the second detection field 60B that is positioned at the other end in the main scanning direction may collectively be referred to as detection fields 60 in the following description. The light-source device 11 is turned on in the first irradiation field 601A that is scanned by the light deflector 13 from the first detection field 60A to one end (i.e., the left end 630L of the scanning line 630), and the light-source device 11 is turned on in the second irradiation field 602A that is scanned by the light deflector 13 from the other end (i.e., the right end 630R of the scanning line 630) towards the first detection field 60B. Moreover, an edge of the first irradiation field 601A facing the first detection field 60A is made to move to get close to the first detection field 60A from a position away from the first detection field 60A, and an edge of the second irradiation field 602A facing the second detection field 60B is made to move to get close to the second detection field 60B from a position away from the second detection field 60B.

Further, the shielding part 74 is provided that shields a part of the irradiation light that is scanned by the light deflector 13, and the first irradiation field 601A and the second irradiation field 602A is included in the area of shielding part 74 that is scanned by the light deflector 13. The first detection field 60A is included in the area of shielding part 74 that is scanned by the light deflector 13. The synchronous detection system 60A is disposed in the shielding part 74.

Due to such a configuration, each one of the first irradiation field 601A and the second irradiation field 602A can be moved to overlap with the first detection field 60A while preventing each one of the first irradiation field 601A and the second irradiation field 602A from going beyond the shielding part 74 towards the other side of an end in the main scanning direction.

In the present embodiment, the screen 15 is provided that is scanned by the irradiation light deflected by the light deflector 13, and the light-source device 11 is turned on in the image area 61 included in the scanning range on the screen 15 that is scanned by the light deflector 13 with the irradiation light, based on the image data to form an image on the screen 15. The first irradiation field 601A and the second irradiation field 602A do not overlap with the image area 61. The first detection field 60A does not overlap with the image area 61.

Accordingly, each one of the first irradiation field 601A and the second irradiation field 602A overlaps with the first detection field 60A while preventing each one of the first irradiation field 601A and the second irradiation field 602A from entering the image area 61.

The timing at which the light-source device 11 starts emitting light is advanced such that an edge of the first irradiation field 601A facing the first detection field 60A moves to get close to the first detection field 60A from a position away from the first detection field 60A, and the timing at which the light-source device 11 stops emitting light is delayed such that an edge of the second irradiation field 602A facing the first detection field 60A moves to get close to the first detection field 60A from a position away from the first detection field 60A.

Alternatively, the scanning range that is scanned by the light deflector 13 may be reduced in the main scanning direction such that an edge of the first irradiation field 601A facing the first detection field 60A moves to get close to the first detection field 60A from a position away from the first detection field 60A and that an edge of the second irradiation field 602A facing the first detection field 60A moves to get close to the first detection field 60A from a position away from the first detection field 60A.

Then, the scanning range that is scanned by the light deflector 13 is increased in the main scanning direction, and the light-source device 11 is turned on in the first irradiation field 601A and the second irradiation field 602A.

In the present embodiment, the drive frequency with which the light deflector 13 is driven (an example of the amount of drive control) is corrected based on whether the timing at which an edge of the first irradiation field 601A facing the first detection field 60A overlaps with the first detection field 60A is equivalent to the timing at which an edge of the second irradiation field 602A facing the first detection field 60A overlaps with the first detection field 60A. Accordingly, the position of the irradiation light in the scanning range that is scanned by the light deflector 13 is corrected.

Alternatively, the drive frequency with which the light deflector 13 is driven (an example of the amount of drive control) is corrected based on the amount of movement when an edge of the first irradiation field 601A facing the first detection field 60A is moved from a position away from the first detection field 60A to a position at which the first irradiation field 601A overlaps with the first detection field 60A and the amount of movement when an edge of the second irradiation field 602A facing the first detection field 60A is moved from a position away from the first detection field 60A to a position at which the second irradiation field 602A overlaps with the first detection field 60A. Accordingly, the position of the irradiation light in the scanning range that is scanned by the light deflector 13 is corrected.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The display device according to an embodiment of the present disclosure is applicable not only to a heads-up display (HUD) but also to, for example, a head-mounted display, a prompter, and a projector. For example, when a display device according to an embodiment of the present disclosure is applied to a projection device, such a projection device can be configured in a similar manner to the display device 10. In other words, the display device 10 may project the image light onto, for example, a projection screen or a wall through the free-form surface mirror 30. The display device 10 may project the image light that has passed through the screen 15 onto, for example, a projection screen or a wall, without involving the free-form surface mirror 30.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An optical scanner comprising:
a light source configured to emit irradiation light;
a light deflector configured to scan the irradiation light emitted from the light source in a first scanning direction and in a second scanning direction intersecting with the first scanning direction;
a photodetector configured to detect the irradiation light when the light deflector scans a detection field; and
circuitry configured to,
   turn on the light source in a first irradiation field scanned by the light deflector from the detection field to an end in the first scanning direction and turn on the light source in a second irradiation field scanned by the light deflector from the end in the first scanning direction towards the detection field, and
   cause a position of an edge of the first irradiation field on the detection field side to move in the first scanning direction closer to the detection field and cause a position of an edge of the second irradiation field on the detection field side to move in the first scanning direction closer to the detection field.

2. The optical scanner according to claim 1,
wherein the detection field includes a first detection field positioned at an end in the first scanning direction and a second detection field positioned at another end in the first scanning direction,
wherein the circuitry is configured to,
turn on the light source in the first irradiation field scanned by the light deflector from the first detection field to the end in the first scanning direction, and turn on the light source in the second irradiation field scanned by the light deflector from the another end in the first scanning direction towards the second detection field, and
cause a position of an edge of the first irradiation field facing the first detection field to move closer to the first detection field, and cause an edge of the second irradiation field facing the second detection field to move in the first scanning direction closer to the second detection field.

3. The optical scanner according to claim 1, further comprising:
a shielding part configured to shield some of the irradiation light that is scanned by the light deflector,
wherein, at least after movement of the first irradiation field and the second irradiation field, the first irradiation field and the second irradiation field are included in an area of the shielding part scanned by the light deflector.

4. The optical scanner according to claim 3, wherein the detection field is included in an area of the shielding part scanned by the light deflector.

5. The optical scanner according to claim 4, wherein the photodetector is disposed on the shielding part.

6. The optical scanner according to claim 1, further comprising:
a screen on which the irradiation light is scanned by the light deflector, wherein
the circuitry is configured to turn on the light source in an image area on the screen, the image area being included in a scanning range scanned by the light deflector using the irradiation light, based on image data, to form an image on the screen.

7. The optical scanner according to claim 6, wherein the first irradiation field and the second irradiation field do not overlap with the image area.

8. The optical scanner according to claim 7, wherein the detection field do not overlap with the image area.

9. The optical scanner according to claim 1, wherein the circuitry is configured to,
advance a timing at which the light source starts emitting light to move an edge of the first irradiation field facing the detection field closer to the detection field, and
delay a timing at which the light source stops emitting light to move an edge of the second irradiation field facing the detection field closer to the detection field.

10. The optical scanner according to claim 1, wherein the circuitry is configured to,
reduce a scanning range scanned by the light deflector in the first scanning direction to move an edge of the first irradiation field facing the detection field closer to the detection field, and
reduce the scanning range scanned by the light deflector in the first scanning direction to move an edge of the second irradiation field facing the detection field closer to the detection field.

11. The optical scanner according to claim 1, wherein the circuitry is configured to increase a scanning range scanned by the light deflector in the first scanning direction and turn on the light source in the first irradiation field and the second irradiation field.

12. The optical scanner according to claim 1, wherein the circuitry is configured to correct a position of the irradiation light in a scanning range scanned by the light deflector based on whether a timing at which the edge of the first irradiation field facing the detection field overlaps with the detection field is equivalent to a timing at which the edge of the second irradiation field facing the detection field overlaps with the detection field.

13. The optical scanner according to claim 1, wherein the circuitry is configured to correct a position of the irradiation light in a scanning range scanned by the light deflector based on a first amount of movement when an edge of the first irradiation field facing the detection field is moved from a position away from the detection field to a position where the first irradiation field overlaps with the detection field and a second amount of movement when an edge of the second irradiation field facing the detection field is moved from a position away from the detection field to a position where the second irradiation field overlaps with the detection field.

14. The optical scanner according to claim 12, wherein the circuitry is configured to correct an amount of drive control for the light deflector.

15. A display system comprising:
an optical scanner including,
a light source configured to emit irradiation light,
a light deflector configured to scan the irradiation light emitted from the light source in a first scanning direction and in a second scanning direction intersecting with the first scanning direction,
a photodetector configured to detect the irradiation light when the light deflector scans a detection field; and
circuitry configured to,
turn on the light source in a first irradiation field scanned by the light deflector from the detection field to an end in the first scanning direction and turn on the light source in a second irradiation field scanned by the light deflector from the end in the first scanning direction towards the detection field, and
cause a position of an edge of the first irradiation field on the detection field side to move in the first scanning direction closer to the detection field from a position away from the detection field and cause a position of an edge of the second irradiation field on the detection field side to move in the first scanning direction closer to the detection field;
an imaging optical system configured to reflect projection light projected from a screen on which the irradiation light is scanned by the light deflector; and
a reflector configured to reflect reflection light reflected by the imaging optical system,
wherein the imaging optical system projects the projection light towards the reflector to form a virtual image.

16. The display system according to claim 15, wherein the optical scanner further comprises:

a shielding part configured to shield some of the irradiation light that is scanned by the light deflector,
  wherein, at least after movement of the first irradiation field and the second irradiation field, the first irradiation field and the second irradiation field are included in an area of the shielding part scanned by the light deflector.

17. The display system according to claim 15, wherein the circuitry is configured to correct a position of the irradiation light in a scanning range scanned by the light deflector based on whether a timing at which the edge of the first irradiation field facing the detection field overlaps with the detection field is equivalent to a timing at which the edge of the second irradiation field facing the detection field overlaps with the detection field.

18. A mobile object that includes a display system, the display system comprising:
  an optical scanner including,
    a light source configured to emit irradiation light,
    a light deflector configured to scan the irradiation light emitted from the light source in a first scanning direction and in a second scanning direction intersecting with the first scanning direction,
    a photodetector configured to detect the irradiation light when the light deflector scans a detection field; and
    circuitry configured to,
      turn on the light source in a first irradiation field scanned by the light deflector from the detection field to an end in the first scanning direction and turn on the light source in a second irradiation field scanned by the light deflector from the end in the first scanning direction towards the detection field, and
      cause a position of an edge of the first irradiation field on the detection field side to move in the first scanning direction closer to the detection field and cause a position of an edge of the second irradiation field on the detection field side to move in the first scanning direction closer to the detection field;
  an imaging optical system configured to reflect projection light projected from a screen on which the irradiation light is scanned by the light deflector; and
  a front windshield configured to reflect reflection light reflected by the imaging optical system,
    wherein the imaging optical system projects the projection light towards the front windshield to form a virtual image.

19. The mobile object according to claim 18, wherein the optical scanner further comprises:
  a shielding part configured to shield some of the irradiation light that is scanned by the light deflector,
    wherein, at least after movement of the first irradiation field and the second irradiation field, the first irradiation field and the second irradiation field are included in an area of the shielding part scanned by the light deflector.

20. The mobile object according to claim 18, wherein the circuitry is configured to correct a position of the irradiation light in a scanning range scanned by the light deflector based on whether a timing at which the edge of the first irradiation field facing the detection field overlaps with the detection field is equivalent to a timing at which the edge of the second irradiation field facing the detection field overlaps with the detection field.

* * * * *